(12) United States Patent
Zhang et al.

(10) Patent No.: US 12,118,810 B2
(45) Date of Patent: Oct. 15, 2024

(54) SPATIOTEMPORAL RECYCLING NETWORK

(71) Applicant: QUALCOMM Incorporated, San Diego, CA (US)

(72) Inventors: Yizhe Zhang, San Diego, CA (US); Amirhossein Habibian, Amsterdam (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/408,779

(22) Filed: Aug. 23, 2021

(65) Prior Publication Data
US 2022/0058452 A1    Feb. 24, 2022

Related U.S. Application Data

(60) Provisional application No. 63/069,255, filed on Aug. 24, 2020.

(51) Int. Cl.
   *G06V 20/40* (2022.01)
   *G06F 18/21* (2023.01)
   (Continued)

(52) U.S. Cl.
   CPC ............ *G06V 30/274* (2022.01); *G06F 18/21* (2023.01); *G06F 18/22* (2023.01);
   (Continued)

(58) Field of Classification Search
   CPC .... G06V 30/274; G06V 10/40; G06V 10/751; G06V 20/49; G06V 20/46; G06V 10/759;
   (Continued)

(56) References Cited

U.S. PATENT DOCUMENTS

2019/0043203 A1* 2/2019 Fleishman .............. G06F 18/29
2019/0130187 A1* 5/2019 Hu ......................... H04N 7/013
(Continued)

OTHER PUBLICATIONS

Li, Yule, Jianping Shi, and Dahua Lin. "Low-latency video semantic segmentation." Proceedings of the IEEE Conference on Computer Vision and Pattern Recognition. 2018. (Year: 2018).*
(Continued)

*Primary Examiner* — Amandeep Saini
*Assistant Examiner* — Denise G Alfonso
(74) *Attorney, Agent, or Firm* — Polsinelli/Qualcomm

(57) ABSTRACT

Systems, methods, and non-transitory media are provided for providing spatiotemporal recycling networks (e.g., for video segmentation). For example, a method can include obtaining video data including a current frame and one or more reference frames. The method can include determining, based on a comparison of the current frame and the one or more reference frames, a difference between the current frame and the one or more reference frames. Based on the difference being below a threshold, the method can include performing semantic segmentation of the current frame using a first neural network. The semantic segmentation can be performed based on higher-spatial resolution features extracted from the current frame by the first neural network and lower-resolution features extracted from the one or more reference frames by a second neural network. The first neural network has a smaller structure and/or a lower processing cost than the second neural network.

31 Claims, 13 Drawing Sheets

(51) Int. Cl.
| | |
|---|---|
| *G06F 18/22* | (2023.01) |
| *G06F 18/2411* | (2023.01) |
| *G06N 3/045* | (2023.01) |
| *G06T 1/00* | (2006.01) |
| *G06T 7/136* | (2017.01) |
| *G06T 7/174* | (2017.01) |
| *G06T 7/215* | (2017.01) |
| *G06V 10/40* | (2022.01) |
| *G06V 10/75* | (2022.01) |
| *G06V 10/94* | (2022.01) |
| *G06V 30/262* | (2022.01) |

(52) U.S. Cl.
CPC ......... *G06F 18/2411* (2023.01); *G06N 3/045* (2023.01); *G06T 1/0007* (2013.01); *G06T 7/136* (2017.01); *G06T 7/174* (2017.01); *G06T 7/215* (2017.01); *G06V 10/40* (2022.01); *G06V 10/751* (2022.01); *G06V 10/95* (2022.01); *G06V 20/46* (2022.01); *G06V 20/49* (2022.01); *G06T 2207/10016* (2013.01); *G06T 2207/20084* (2013.01); *G06V 10/759* (2022.01)

(58) Field of Classification Search
CPC ............. G06V 10/454; G06V 10/7715; G06V 10/806; G06V 10/82; G06F 18/22; G06F 18/2411; G06N 3/045; G06T 1/0007; G06T 7/136; G06T 7/174; G06T 7/215; G06T 2207/10016; G06T 2207/20084; G06T 7/11

See application file for complete search history.

(56) References Cited

U.S. PATENT DOCUMENTS

2020/0134827 A1* 4/2020 Saha .................. G06F 18/2431
2021/0319232 A1* 10/2021 Perazzi ................ G06F 18/253

OTHER PUBLICATIONS

Shelhamer, Evan, et al. "Clockwork convnets for video semantic segmentation." Computer Vision—ECCV 2016 Workshops: Amsterdam, The Netherlands, Oct. 8-10 and 15-16, 2016, Proceedings, Part III 14. Springer International Publishing, 2016. (Year: 2016).*

Fayyaz, Mohsen, et al. "STFCN: spatio-temporal FCN for semantic video segmentation." arXiv preprint arXiv:1608.05971 (2016). (Year: 2016).*

Xu, Shuangjie, et al. "Jointly attentive spatial-temporal pooling networks for video-based person re-identification." Proceedings of the IEEE international conference on computer vision. 2017. (Year: 2017).*

International Search Report and Written Opinion—PCT/US2021/047279—ISA/EPO—Dec. 10, 2021.

Jain S., et al., "Accel: A Corrective Fusion Network for Efficient Semantic Segmentation on Video", arxiv. org. Cornell University Library, 201 OLIN Library Cornell University Ithaca, NY 14853, Jul. 17, 2018 (Jul. 17, 2018), XP081552589, 10 Pages, The Whole Document.

Shelhamer E., et al., "Clockwork Convnets for Video Semantic Segmentation", arxiv. org. Cornell University Library, 201 Olin Library Cornell University Ithaca, NY 14853, Aug. 11, 2016 (Aug. 11, 2016), XP080719713, 16 Pages, Abstract figures 1.3.5 sections 4. 4.1. 4.3. 5.3.

Shelhamer E., et al., "Fully Convolutional Networks for Semantic Segmentation", IEEE Transactions on Pattern Analysis and Machine Intelligence, vol. 39, No. 4. Apr. 1, 2017 (Apr. 1, 2017), pp. 640-651, XP055865277, 12 Pages, USA ISSN: 0162-8828, DOI: 10.1109/TPAMI.2016.2572683, Abstract Section 3.

* cited by examiner

SPATIOTEMPORAL RECYCLING NETWORK

CROSS-REFERENCE TO RELATED APPLICATIONS

The present application claims the benefit of U.S. Provisional Application No. 63/069,255, filed Aug. 24, 2020, entitled "SPATIOTEMPORAL RECYCLING NETWORK," which is hereby incorporated by reference in its entirety and for all purposes.

TECHNICAL FIELD

The present disclosure generally relates to semantic video segmentation.

BACKGROUND

The increasing versatility of digital camera products has allowed digital cameras to be integrated into a wide array of devices and has expanded their use to a variety of applications. For example, phones, vehicles, computers, gaming systems, wearable devices, and many other systems today are often equipped with cameras. The cameras allow any system equipped with a camera to capture videos and/or images. The videos and/or images can be captured for recreational use, professional photography, surveillance, and automation, among other applications. Moreover, cameras are increasingly equipped with specific functionalities for modifying and/or manipulating videos and/or images for a variety of effects and/or applications. For example, many cameras are equipped with video/image processing capabilities for detecting objects on captured images, generating different image and/or video effects, etc.

Current video/image processing techniques oftentimes rely on image segmentation algorithms that divide an image into multiple segments, which can be analyzed or processed to detect people or objects in the image, produce specific image effects, and/or for various other functionalities. Some example applications of image segmentation can include, without limitation, feature extraction, recognition tasks (e.g., object recognition, face recognition, action recognition, etc.), machine vision, video enhancement, extended reality (XR), automation, and estimating depth maps.

BRIEF SUMMARY

Disclosed are systems, processes (also referred to as methods), and computer-readable media for providing spatiotemporal recycling networks for video segmentation. According to at least one example, a method is provided for efficient semantic video segmentation using spatiotemporal recycling networks. The method can include obtaining video data including a current frame and one or more reference frames; determining, based on a comparison of the current frame and the one or more reference frames, a difference between the current frame and the one or more reference frames; and based on the difference being below a threshold, performing semantic segmentation of the current frame using a first neural network based on higher-spatial resolution features extracted from the current frame and lower-spatial resolution features extracted from the one or more reference frames by a second neural network, the first neural network having a smaller structure and/or a lower processing cost than the second neural network.

According to at least one example, an apparatus is provided for efficient semantic video segmentation using spatiotemporal recycling networks. In some examples, the apparatus can include at least one memory and one or more processors coupled to the at least one memory, the one or more processors being configured to obtain video data including a current frame and one or more reference frames; determine, based on a comparison of the current frame and the one or more reference frames, a difference between the current frame and the one or more reference frames; and based on the difference being below a threshold, perform semantic segmentation of the current frame using a first neural network based on higher-spatial resolution features extracted from the current frame and lower-spatial resolution features extracted from the one or more reference frames by a second neural network, the first neural network having a smaller structure and/or a lower processing cost than the second neural network.

According to at least one example, a non-transitory computer-readable medium is provided for efficient semantic video segmentation using spatiotemporal recycling networks. The non-transitory computer-readable medium can include instructions stored thereon which, when executed by one or more processors, cause the one or more processors to obtain video data including a current frame and one or more reference frames; determine, based on a comparison of the current frame and the one or more reference frames, a difference between the current frame and the one or more reference frames; and based on the difference being below a threshold, perform semantic segmentation of the current frame using a first neural network based on higher-spatial resolution features extracted from the current frame and lower-spatial resolution features extracted from the one or more reference frames by a second neural network, the first neural network having a smaller structure and/or a lower processing cost than the second neural network.

According to at least one example, an apparatus is provided for efficient semantic video segmentation using spatiotemporal recycling networks. The apparatus can include means for obtaining video data including a current frame and one or more reference frames; determining, based on a comparison of the current frame and the one or more reference frames, a difference between the current frame and the one or more reference frames; and based on the difference being below a threshold, performing semantic segmentation of the current frame using a first neural network based on higher-spatial resolution features extracted from the current frame and lower-spatial resolution features extracted from the one or more reference frames by a second neural network, the first neural network having a smaller structure and/or a lower processing cost than the second neural network.

In some aspects, the method, apparatuses, and non-transitory computer-readable medium described above can generate, based on the semantic segmentation, a segmentation output including one or more segmentation maps associated with the current frame.

In some examples, the second neural network can include a segmentation network and the first neural network can include a subnetwork structure of the segmentation network.

In some examples, the difference can include a difference between pixel values associated with the current frame and pixel values associated with the one or more reference frames. In some cases, the difference can include an amount of change in motion between the current frame and the one or more reference frames. In some cases, the difference can be based on a distance between one or more boundaries in a first boundary map associated with the current frame and one or more boundaries in a second boundary map associated with the one or more reference frames.

In some examples, the comparison can include generating a score using classification network, the score indicating a magnitude of the difference between the current frame and the one or more reference frames. In some cases, the comparison can include an image-level comparison and/or a region-level comparison, and the difference can be based on the image-level comparison and/or the region-level comparison.

In some examples, the second neural network can include a multi-level network structure. In some cases, the multi-level network structure includes one or more deeper levels than a network structure associated with the first neural network, and the lower-spatial resolution features can be extracted at the one or more deeper levels of the multi-level network structure.

In some aspects, the semantic segmentation can be further based on one or more segmentation maps generated based on one or more previous frames.

In some cases, performing the semantic segmentation can include obtaining the lower-spatial resolution features from storage; pooling the lower-spatial resolution features; determining a set of features associated with the current frame, the set of features being determined by combining the pooled lower-spatial resolution features with the higher-spatial resolution features; and generating a segmentation output based on the set of features associated with the current frame.

In some aspects, the method, apparatuses, and non-transitory computer-readable medium described above can generate a feature update based on a convolution-based fusion of the pooled lower-spatial resolution features and the higher-spatial resolution features, and store the feature update in the storage.

In some aspects, the method, apparatuses, and non-transitory computer-readable medium described above can determine, based on a second comparison an additional frame and one or more additional reference frames, an additional difference between the additional frame and the one or more additional reference frames; and based on the additional difference being above the threshold, performing, using the second neural network, semantic segmentation of the additional frame.

In some aspects, each apparatus described above is or includes a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, an autonomous vehicle, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
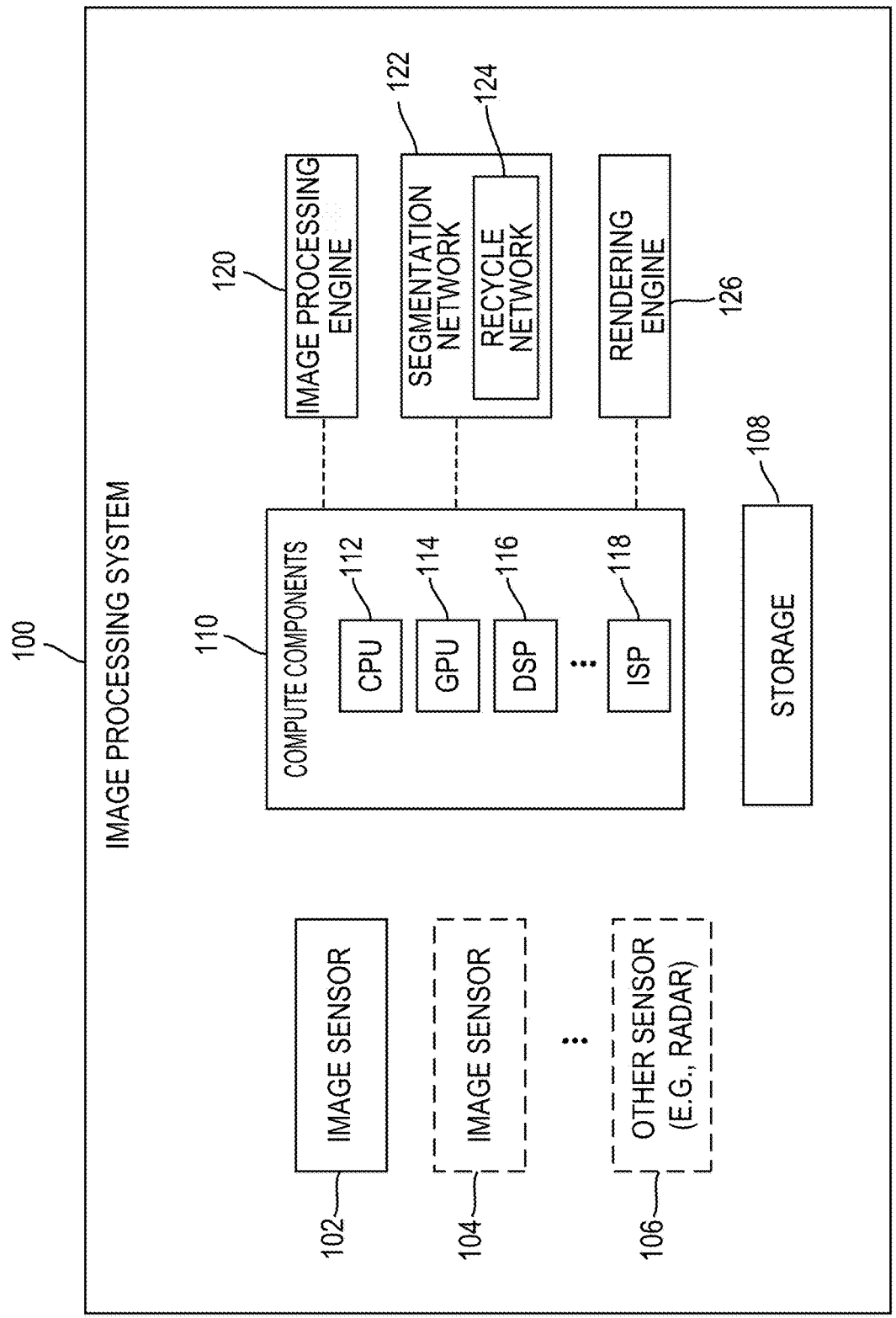
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The present disclosure describes systems, processes (or methods), and computer-readable media (collectively referred to herein as "systems and techniques") for providing spatiotemporal recycling neural networks for video segmentation. In some examples, the systems and techniques described herein can perform semantic video segmentation using both a spatiotemporal recycling network and a segmentation network having a larger structure and/or larger processing/resource requirements than the spatiotemporal recycling network. For example, the systems and techniques herein can implement the segmentation network to extract features from certain frames (e.g., video frames of a video) and to generate segmentation maps for the frames based on the extracted features. The systems and techniques can implement a smaller and/or more efficient spatiotemporal recycling neural network (also referred to as a recycle network or recycle neural network) to generate segmentation maps for additional frames (e.g., additional frames of the video) by reusing deeper features extracted by the segmentation network from previous frames.

In some examples, the deeper features can include lower-spatial resolution features and/or features extracted from deeper hierarchical levels of a multi-level neural network structure (e.g., one or more levels below a top level of the neural network structure). For example, the deeper features can include features having lower spatial resolution than features extracted by the recycle network. The spatial resolution of features extracted from a neural network structure level can decrease as the hierarchical level of the multi-level neural network decreases. Because the segmentation network has deeper levels than the recycle network, the segmentation network can extract deeper features corresponding such deeper levels.

As noted above, lower-spatial resolution features can include features extracted from deeper levels in a multi-level neural network structure. At deeper levels of a neural network structure, the working field of the network can become increasingly smaller. Accordingly, at the deeper levels of the neural network structure, the neural network can have a larger field of view of the image data being processed. The larger field of view of the image data being processed allows the network to extract features with lower-spatial resolution at the deeper levels of the network structure. Moreover, the lower-spatial resolution of the features can allow the features to represent a greater amount of semantically meaningfully information.

In some cases, the recycle network can be implemented when a difference between a current frame and one or more previous frames is below a threshold. Using the recycle network when the difference is below the threshold can allow the systems and techniques described herein to leverage redundancies between frames, increase efficiency, reduce power and processing costs, among other benefits. For example, in some cases, content (e.g., regions, features and/or feature maps, etc.), motion (e.g., movement of objects), and/or other characteristics of frames can remain static or stationary (or near static or stationary), in which case changes in characteristics between the frames can be gradual. In some cases, content, motion, etc. in frames can be more dynamic and less static or stationary, in which case changes between the frames are less steady with more fluctuation. When content, motion, etc. remain relatively static or stationary between frames, the frames can have a greater amount of redundancy and/or similarities. For example, objects, people, and/or other content in certain frames can be more persistent, maintain a more continuous appearance (and/or characteristics), and/or change more gradually between the frames. Accordingly, the frames can have a high amount of similarities, overlap, and/or redundancy.

The systems and techniques described herein can leverage such redundancy and/or similarities between certain frames to increase processing efficiency and reduce computational costs by recycling (e.g., reusing) features between frames. In some cases, segmentation data for a current frame estimated to be more static or stationary and/or to have more redundancy or similarities relative to one or more previous frames can be determined by the lighter, more efficient recycle neural network. On the other hand, segmentation data for frames estimated to be less static or stationary and/or to have less redundancy or similarities relative to one or more previous frames can be determined by a larger (e.g., with deeper layers), more computationally expensive segmentation neural network (referred to as a full segmentation network).

For example, when a difference between a current frame and a previous frame(s) is below a threshold, the recycle network can be used to segment the current frame. The recycle network can recycle (e.g., reuse) one or more features extracted from the previous frame(s) by the full segmentation network, which can reduce the amount of features the recycle network extracts from a current frame when performing segmentation of the current frame (e.g., to generate one or more segmentation maps). Reusing the one or more features from the previous frame can increase the segmentation efficiency for the current frame (and any other frames processed by the recycle network) and can reduce processing costs. At other times, when a difference between a frame and a previous frame(s) is above a threshold (or when processing a first or initial frame), the full segmentation network can be implemented to segment the frame and perform a deeper, more robust feature extraction for the frame. In this way, a video segmentation process can switch or alternate between running a larger segmentation network (the full segmentation network) and a lighter recycle network to reduce the overall processing costs and increase the overall processing efficiency while producing high quality and accurate video segmentation results.

Further details regarding the systems and techniques will be described in the following disclosure with respect to the figures. FIG. 1 is a diagram illustrating an example image processing system 100, in accordance with some examples. The image processing system 100 can perform various image and video processing tasks and generate various image and video processing results as described herein. For example, the image processing system 100 can perform semantic video segmentation as further described herein. In some examples, the image processing system 100 can implement a segmentation network 122 and a recycle network 124 to efficiently generate semantic segmentation maps for video frames by reusing or recycling one or more features in the video frames to reduce power consumption and increase performance associated with the video segmentation. In other examples, the image processing system 100 can perform additional video and/or image processing tasks such as, for example, generating depth-of-field images, generating chroma keying effects, feature extraction, image recognition tasks, machine vision, and/or any other image/video processing tasks.

In the example shown in FIG. 1, the image processing system 100 includes an image sensor 102, a storage 108, compute components 110, an image processing engine 120, a segmentation network 122, a recycle network 124, and a rendering engine 126. The image processing system 100 can also optionally includes another image sensor 104 and one or more sensors 106, such as an inertial measurement unit (IMU), a radar, an optical sensor, a light detection and ranging (LIDAR) sensing device, a motion sensor, and/or any other type of sensor. For example, in dual camera or image sensor applications, the image processing system 100 can include front and rear image sensors (e.g., image sensor 102 and/or image sensor 104).

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a gaming console, a video streaming device, a smart wearable device, an autonomous system, a computer in a car, an Internet-of-Things (IoT) device, or any other suitable electronic device(s).

In some implementations, the image sensor 102, the image sensor 104, the other sensor 106, the storage 108, the compute components 110, the image processing engine 120, the segmentation network 122, the recycle network 124, and the rendering engine 126 can be part of the same computing device. For example, in some cases, the image sensor 102, the image sensor 104, the other sensor 106, the storage 108, the compute components 110, the image processing engine 120, the segmentation network 122, the recycle network 124, and the rendering engine 126 can be integrated into a mobile phone (e.g., a cellular phone or smartphone), extended reality (XR) device (e.g., a virtual reality (VR) device, an augmented reality (AR) device, or mixed reality (MR) device, such as a head-mounted display or AR/MR glasses), laptop, tablet computer, smart wearable device, gaming system, camera system, server, television, set-top box, and/or any other computing device. However, in some implementations, the image sensor 102, the image sensor 104, the other sensor 106, the storage 108, the compute components 110, the image processing engine 120, the segmentation network 122, the recycle network 124, and the rendering engine 126 can be part of two or more separate computing devices.

The image sensors 102 and 104 can be any image and/or video sensors or capturing devices, such as a digital camera sensor, a video camera sensor, a smartphone camera sensor, an image/video capture device on an electronic apparatus such as a television or computer, a camera, etc. In some cases, the image sensors 102 and 104 can be part of a camera or computing device such as a digital camera, a video camera, an IP camera, a smartphone, a smart television, a game system, etc. In some examples, the image sensor 102 can be a rear image capturing device (e.g., a camera, video, and/or image sensor on a back or rear of a device) and the image sensor 104 can be a front image capturing device (e.g., a camera, image, and/or video sensor on a front of a device). In some examples, the image sensors 102 and 104 can be part of a dual-camera assembly. The image sensors 102 and 104 can capture the image and/or video content (e.g., raw image and/or video data), which can then be processed by the compute components 110, the image processing engine 120, the segmentation network 122, the recycle network 124, and/or the rendering engine 126 as described herein.

The other sensor 106 can be any sensor for detecting and measuring information such as distance, motion, position, depth, speed, light, sound, etc. Non-limiting examples of sensors include LIDARs, gyroscopes, accelerometers, magnetometers, IMUs, etc. In one illustrative example, the sensor 106 can be an IMU configured to sense or measure motion. In some cases, the image processing system 100 can include other sensors, such as a machine vision sensor, a smart scene sensor, a speech recognition sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from any of the sensors 102, 104, 106, data from the compute components 110 (e.g., processing parameters, output images, calculation results, etc.), and/or data from any of the image processing engine 120, the segmentation network 122, the recycle network 124, and the rendering engine 126 (e.g., output images, processing results, etc.). In some examples, the storage 108 can include a buffer for storing data (e.g., image/video data) for processing by the compute components 110.

In some implementations, the compute components 110 can include a central processing unit (CPU) 112, a graphics processing unit (GPU) 114, a digital signal processor (DSP) 116, and/or an image signal processor (ISP) 118. The compute components 110 can perform various operations such as video segmentation, image enhancement, object or image segmentation, computer vision, graphics rendering, augmented reality, image/video processing, sensor processing, recognition (e.g., text recognition, object recognition, feature recognition, tracking, pattern recognition, scene change recognition, etc.), disparity detection, machine learning, filtering, depth-of-field effect calculations or renderings, and/or any of the various operations described herein. In some examples, the compute components 110 can implement the image processing engine 120, the segmentation network 122, the recycle network 124, and the rendering engine 126. In other examples, the compute components 110 can also implement one or more other processing engines.

Moreover, the operations for the image processing engine 120, the segmentation network 122, the recycle network 124, and the rendering engine 126 can be implemented by one or more of the compute components 110. In one illustrative example, the image processing engine 120, the segmentation network 122, and the recycle network 124 (and associated operations) can be implemented by the CPU 112, the DSP 116, and/or the ISP 118, and the rendering engine 126 (and associated operations) can be implemented by the GPU 114. In some cases, the compute components 110 can include other electronic circuits or hardware, computer software, firmware, or any combination thereof, to perform any of the various operations described herein.

In some cases, the compute components 110 can receive data (e.g., image data, video data, etc.) captured by the image sensor 102 and/or the image sensor 104, and process the data to generate output images or frames. In some examples, the compute components 110 can receive video data (e.g., one or more frames, etc.) captured by the image sensor 102, perform semantic segmentation, detect or extract features and information (e.g., color information, texture information, semantic information, etc.), calculate disparity and saliency information, perform background and foreground object segmentation, generate segmentation and/or feature maps, etc. An image or frame can be a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

The compute components 110 can implement the image processing engine 120, the segmentation network 122 and the recycle network 124 to perform various image/video processing operations. For example, the compute components 110 can implement the image processing engine 120, the segmentation network 122 and the recycle network 124 to perform semantic video segmentation, feature extraction, superpixel detection, disparity mapping, spatial mapping, saliency detection, blurring, filtering, color correction, noise reduction, scaling, ranking, recognition, etc. The compute components 110 can process data (e.g., images, frames, videos, etc.) captured by the image sensors 102 and/or 104, data in storage 108, data received from a remote source (e.g., a remote camera, a server or a content provider), data obtained from a combination of sources, any combination thereof, and/or other data.

In some examples, the compute components 110 can segment images/frames, extract features in the images/frames, and generate an output such as a segmentation map, a feature map, a video, an image, etc. In some cases, the compute components 110 can use spatial information (e.g., a spatial prior map), disparity information (e.g., a disparity map), spatiotemporal information, extracted features, etc., to segment video frames. In some examples, the compute components 110 can multiple frames and/or features from multiple frames when performing video segmentation for a frame. In some cases, the compute components 110 can extract features from a frame and/or generate segmentation maps using data from the image sensor and/or any other sensor device such as an IMU, a LIDAR sensor etc.

In some examples, the compute components 110 can perform semantic video segmentation for high resolution video frames even in single camera or image sensor implementations, such as mobile phones having a single camera or image sensor. The semantic video segmentation can enable (or be used in conjunction with) other image adjustments or image processing operations such as, for example, and without limitation, extended reality, object detection, video enhancement, etc.

In some cases, the compute components 110 can implement the segmentation network 122 to extract features from frames and generate segmentation maps. In some cases, the compute components 110 can implement the recycle network 124 to extract features from frames and generate segmentation maps using at least some features and/or segmentation information generated by the segmentation network 122. In some examples, the segmentation network 122 and the recycle network 124 can each include a neural network. The segmentation network 122 can be a larger and/or more robust neural network (e.g., by having more layers, functions, nodes, parameters, etc.) than the recycle network 124. The segmentation network 122 can be implemented at times during a video segmentation process to extract deeper features and generate segmentation maps for a video frame. The recycle network 124 can be a smaller (or lighter) neural network with a lower processing cost (e.g., by having less layers, functions, nodes, parameters, etc.) as compared to the segmentation network 122. The recycle network 124 can be implemented at other times during the video segmentation process when the segmentation network 122 is not used (e.g., based on a difference between a current frame and one or more reference frames being below a threshold).

For example, the segmentation network 122 can be implemented to process one or more frames to extract deeper features from the frames and generate segmentation data. In such an example, the recycle network 124 can be implemented for other frames to extract features from those frames and generate segmentation data using the features extracted from those frames as well as reused features generated by the segmentation network 122 from one or more previous frames. By reducing the use of the larger and/or more computationally intensive segmentation network 122 and allowing the lighter, more efficient recycle network 124 to reuse features and/or segmentation data from the segmentation network 122, the segmentation network 122 and the recycle network 124 can together perform semantic video segmentation with high accuracy and lower processing costs and/or requirements.

In some examples, the deeper features can include features having a lower-spatial resolution than features extracted using the recycle network 124. In some cases, the deeper features can include features extracted at deeper neural network levels within the segmentation network 122. For example, in some cases, the segmentation network 122 can include a multi-level structure and the recycle network 124 can include a single-level structure or a multi-level structure having a lower amount of levels than the segmentation network 122. The deeper features can include features extracted at deeper levels of the segmentation network 122 (e.g., below a top level and/or below a lowest level of the recycle network 124). When processing image data, the deeper levels of a neural network can have a larger field of view of the image data and can capture more semantic information than network levels that are more shallow. Deeper features extracted at deeper levels of a network can have a lower-spatial resolution than features extracted at shallower levels of a network, and can capture more semantic information.

Figure 5:
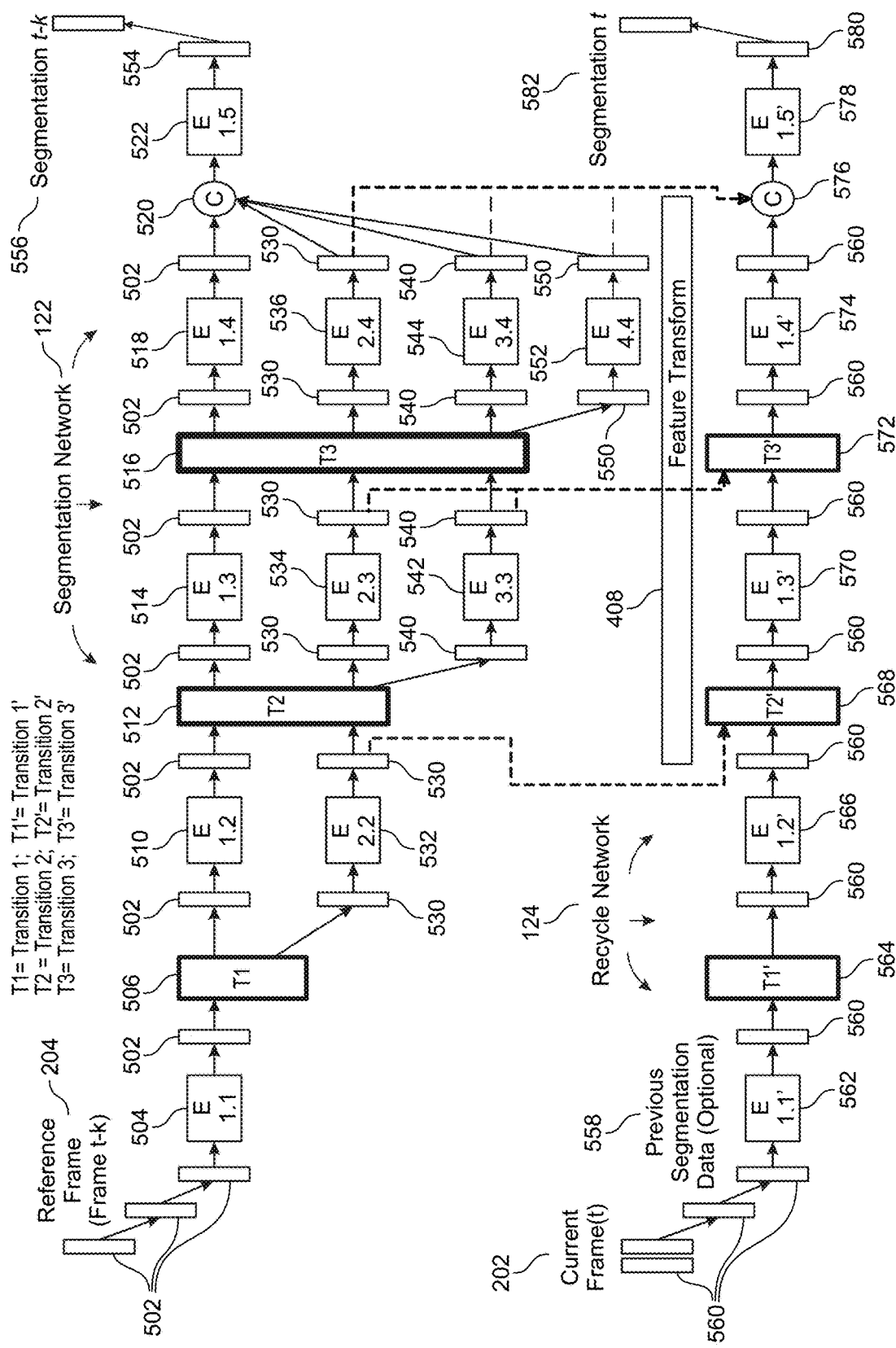
FIG. 5 is a diagram illustrating an example system for video segmentation and feature recycling from a reference frame to a current frame, in accordance with some examples of the present disclosure.
Figure 7:
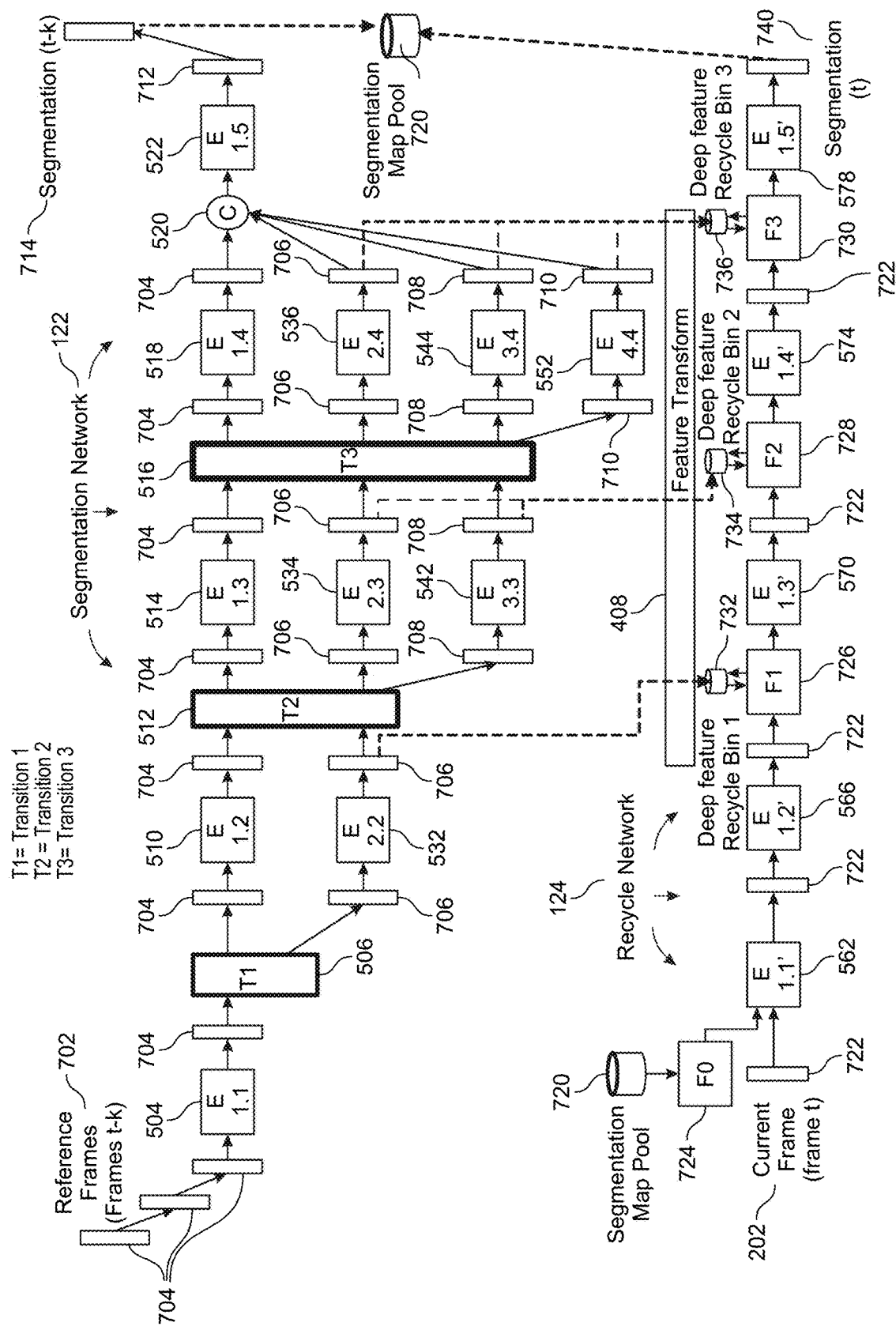
FIG. 7 is a diagram illustrating an example system for video segmentation and feature recycling from reference frames to a current frame, in accordance with some examples of the present disclosure.

The segmentation network 122 and the recycle network 124 can include any segmentation network architecture such as, for example and without limitation, a U-Net, high-resolution network (HR-Net), any type of convolutional neural network (CNN), any combination thereof, and/or other types of neural network architectures. In some cases, the recycle network 124 can be part of the segmentation network 122. For example, the recycle network 124 can be a sub-network and/or sub-structure of the segmentation network 122. In other cases, the segmentation network 122 and the recycle network 124 can be separate neural networks. In some examples, the segmentation network 122 can have a multi-level structure (e.g., as shown in FIG. 5 and FIG. 7) and the recycle network 124 can have a single-level structure or a lower amount of levels than the segmentation network 122 (e.g., as shown in FIG. 5 and FIG. 7). In some cases, the recycle network 124 can be the same as, or can be based on, one or more top levels of the segmentation network 122.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to the computing device architecture 1000 of FIG. 10.

As noted above, in some cases, content (e.g., regions, features and/or feature maps, etc.), motion (e.g., movement of objects), motion, and/or other characteristics can remain static or stationary (or near static or stationary) between frames of a video or other sequence of frames, in which case changes in content between the frames can be gradual (or non-existent in some cases). In other cases, content, motion, etc. can be more dynamic (e.g., less static/stationary), in which case there is more fluctuation in changes between the frames. When content, motion, etc. remain more static or stationary and changes between frames are more gradual, the respective image data of the frames can have a greater amount of redundancy. For example, objects, people, and/or other content in the frames can be more persistent, maintain a more continuous appearance (and/or characteristics), and/or change more gradually. In such cases, the frames can have a higher amount of overlap and redundancy.

The video segmentation approaches described herein can leverage such redundancy between certain frames to increase processing efficiency and reduce computational costs by reusing or recycling features between frames. For instance, a current frame estimated to be more static or stationary and to have more redundancy with respect to previous frames can be processed by the lighter, more efficient recycle network 124, rather than the segmentation network 122. The recycle network 124 can reuse or recycle one or more features from previous frames to reduce the amount of features the recycle network 124 extracts from the current frame and to reduce the amount of new segmentation data the recycle network 124 generates. Reusing the feature(s) generated from the previous frames can increase the video segmentation efficiency for the current frame (and any other frames processed by the recycle network 124) and can reduce processing costs incurred when performing segmentation.

When encountering a frame estimated to be less static or stationary and/or to have less redundancy with respect to previous frames (and/or a first or initial frame), the segmentation network 122 can be implemented to perform a deeper, more robust feature extraction and segmentation process for that frame. In this way, a video segmentation process can switch or alternate between implementing the segmentation network 122 and the recycle network 124, which can reduce the overall processing costs and increase the overall processing efficiency while producing high quality and accurate video segmentation results.

In some cases, the recycle network 124 can recycle (e.g., reuse) features and/or feature maps with lower spatial resolution (e.g., deeper features and/or feature maps), which generally remain more stationary over time. In such cases, instead of implementing the segmentation network 122 to repetitively compute features and/or feature maps with lower spatial resolution, such features and/or feature maps can be recycled (e.g., reused) by the recycle network 124. The recycle network 124 can compute the features and/or feature maps with higher spatial resolution (e.g., more local or shallow features and/or feature maps), which are generally more temporally variant. The recycle network 124 can use the computed features and/or feature maps along with recycled features and/or feature maps to generate a segmentation result (e.g., a segmentation map) for a given frame. As noted above, the segmentation network 122 can be implemented at certain times to compute features and/or feature maps with lower spatial resolution. The segmentation network 122 and the recycle network 124 can thus together perform semantic video segmentation without the need to always run the larger, more computational intensive segmentation network 122 or to repetitively compute certain features and/or feature maps (e.g., lower spatial resolution features and/or feature maps).

Figure 2:
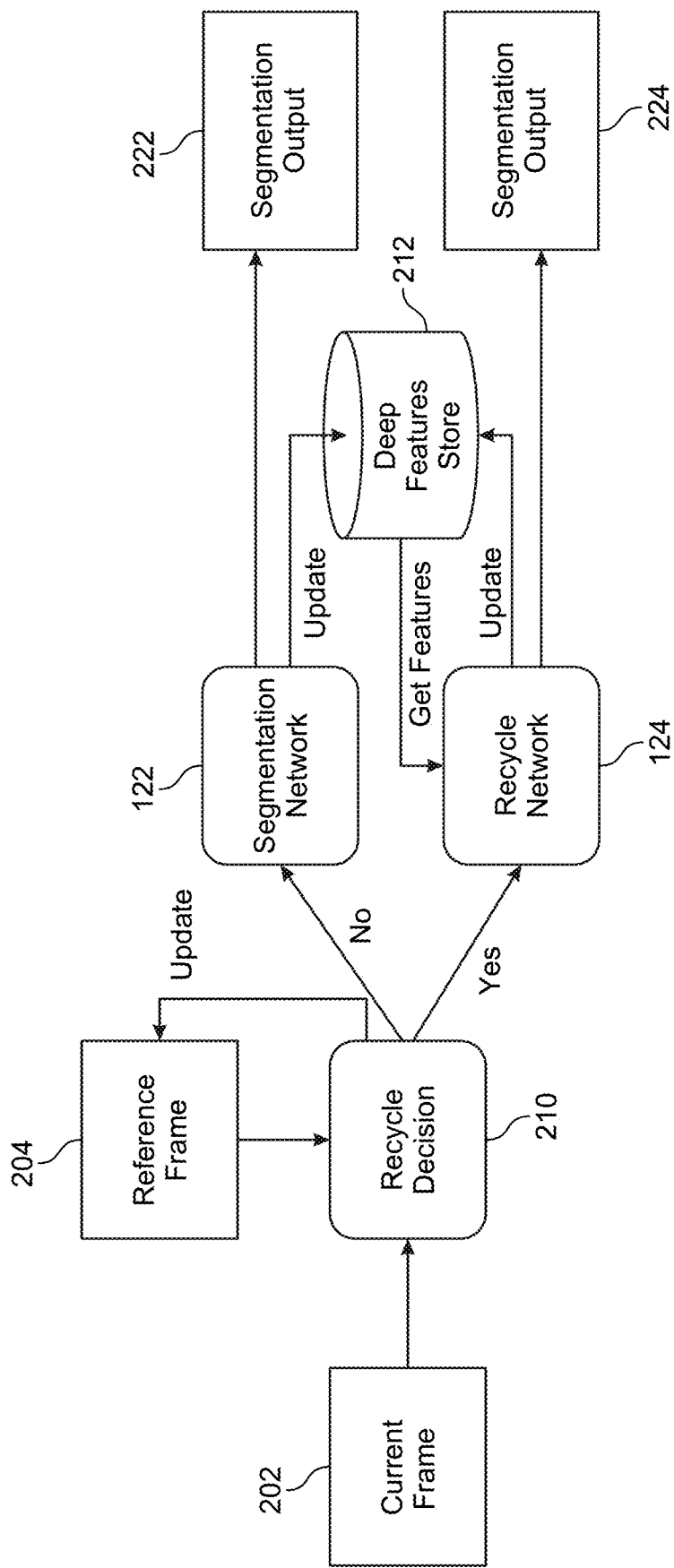
FIG. 2 is a simplified diagram illustrating an example system process for semantic video segmentation using a segmentation network and a recycle network, in accordance with some examples of the present disclosure.

FIG. 2 is a simplified diagram illustrating an example system for semantic video segmentation using segmentation network 122 and recycle network 124. In this example, a recycle decision component 210 can receive a current frame 202 and a reference frame 204 (or multiple reference frames). The recycle decision component 210 can determine whether to use the recycle network 124 or the segmentation network 122 to process (e.g., perform segmentation, feature extraction, etc.) the current frame 202. For example, the recycle decision component 210 can compare the current frame 202 and the reference frame 204 and/or calculate differences between the current frame 202 and the reference frame 204 to determine whether to use the recycle network 124 or the segmentation network 122 (which is a larger and/or more computationally expensive network as compared to the recycle network 124, as previously described) to process the current frame 202.

In some cases, the reference frame 204 can include one or more previous frames. For example, the reference frame 204 can include a previous frame, multiple previous frames, or all previous frames that are prior to the current frame 202 in a video or other sequence of frames. In some cases, the recycle decision component 210 can implement one or more neural networks to determine whether to use the recycle network 124 or the segmentation network 122. For example, the recycle decision component 210 can implement a classification network and/or a regression network.

The recycle decision component 210 can calculate a score of differences and/or similarities between the current frame 202 and the reference frame 204 and determine whether to run the recycle network 124 or the segmentation network 122 based on a calculated score. For example, if the score exceeds a threshold, the recycle decision component 210 can determine to run the segmentation network 122, and if the score is below a threshold, the recycle decision component 210 can determine to run the recycle network 124.

In some examples, the recycle decision component (RDC) 210 can run a score function. An illustrative score function is shown below, where CF is the current frame 202, RF is the reference frame 204, RS is segmentation data associated with the reference frame 204, and T is a pre-defined threshold:

```
RDC(CF, RF, RS, T)
{
    If Score(CF, RF, RS) > T:
        RF = CF
        Return "run segmentation network 122 for CF"
    Else:
        Return "run recycle network 124 for CF"
}
```

For instance, the score function can be defined as or based on an L1 or L2 distance between CF and RF over raw pixels or CNN features (e.g., Score=∥CNN(CF)−CNN(RF)∥). The threshold value of T can be a hyper-parameter (e.g., which can be set experimentally). In one illustrative example, the threshold value of T can be defined as T=0.5*max(CNN(CF)−CNN(RF)).

Any other suitable function can be used for the score function. Using the score function, the recycle decision component 210 can calculate the score of differences and/or similarities between the current frame 202 and the reference frame 204 based on one or more factors. For instance, in some cases, the score can be calculated based on an image difference between the current frame 202 and the reference frame 204. In one illustrative example, the image difference can include an overall pixel value difference between the current frame 202 and the reference frame 204. For instance, the image difference can be calculated by comparing the pixel values of the current frame 202 to the pixel values of the reference frame 204. In some examples, a larger calculated difference can yield a higher score, and smaller calculated difference can yield a lower score.

In another example, the score can be calculated based on an amount of motion in the current frame 202, the reference frame 204, and/or between the current frame 202 and the reference frame 204. Higher motion can yield a higher score than lower motion. In some cases, motion can be determined based on optical flow. Here, in some examples, the higher the magnitude or the average magnitude of the optical flow field, the higher the score returned. Any suitable technique can be used to determine or estimate the optical flow. In some cases, optical flow motion estimation can be performed on a pixel-by-pixel basis. For instance, for each pixel in the current frame y, the motion estimation f defines the location of the corresponding pixel in the previous frame x. The motion estimation f for each pixel can include a vector indicates a movement of the pixel between the frames. In some cases, optical flow maps (also referred to as motion vector maps) can be generated based on the computation of the optical flow vectors between frames. The optical flow maps can include an optical flow vector for each pixel in a frame, where each vector indicates a movement of a pixel between the frames. For instance, a dense optical flow can be computed between adjacent frames to generate optical flow vectors for each pixel in a frame, which can be included in a dense optical flow map. In some cases, the optical flow map can include vectors for less than all pixels in a frame. In one illustrative example, the optical flow vector for a pixel can be a displacement vector (e.g., indicating horizontal and vertical displacements, such as x- and y-displacements) showing the movement of a pixel from a first frame to a second frame.

In one illustrative example, Lucas-Kanade optical flow can be computed between adjacent frames to generate optical flow vectors for some or all pixels in a frame, which can be included in an optical flow map. Any other suitable type of optical flow technique or algorithm can be used to determine optical flow between frames. In another example, a neural network system or model can be used to perform optical flow estimation. One example of a neural network system or model is a FlowNetSimple model based on a convolutional neural network (CNN) architecture. Another example is a FlowNetCorr model based on a CNN architecture.

An illustrative and non-limiting example of optical flow estimation will now be described. As noted above, an optical flow vector or optical flow maps can be computed between adjacent frames of a sequence of frames (e.g., between sets of adjacent frames $x_t$ and $x_{t-1}$). Two adjacent frames can include two directly adjacent frames that are consecutively captured frames or two frames that are a certain distance apart (e.g., within two frames of one another, within three frames of one another, or other suitable distance) in a sequence of frames. Optical flow from frame $x_{t-1}$ to frame $x_t$ can be given by $Ox_{t-1}, x_t = \text{dof}(x_{t-1}, x_t)$, where dof is the dense optical flow. Any suitable optical flow process can be used to generate the optical flow maps. In one illustrative example, a pixel $I(x,y,t)$ in the frame $x_{t-1}$ can move by a distance ($\Delta x, \Delta y$) in the next frame $x_t$. Assuming the pixels are the same and the intensity does not change between the frame $x_{t-1}$ and the next frame $x_t$, the following equation can be assumed:

$$I(x,y,t)=I(x+\Delta x,y+\Delta y,t+\Delta t) \qquad \text{Equation (2)}.$$

By taking the Taylor series approximation of the right-hand side of Equation (2) above, and then removing common terms and dividing by $\Delta t$, an optical flow equation can be derived:

$$f_x u + f_y v + f_t = 0, \qquad \text{Equation (3)}$$

where:

$$f_x = \frac{df}{dx};$$

$$f_y = \frac{df}{dy};$$

$$f_t = \frac{df}{dx};$$

$$u = \frac{\Delta x}{\Delta t}; \text{ and}$$

$$v = \frac{\Delta y}{\Delta t}.$$

Using the optical flow Equation (3), the image gradients $f_x$ and $f_y$ can be found along with the gradient along time (denoted as $f_t$). The terms u and v are the x and y components of the velocity or optical flow of $I(x,y,t)$, and are unknown. An estimation technique may be needed in some cases when the optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

In other examples, using the function, the recycle decision component 210 can calculate the score of differences and/or similarities between the current frame 202 and the reference frame 204 using a trained machine learning system, such as a small or light neural network trained to calculate the score. The trained network can generate a suggestion (e.g., a score) on whether to use the recycle network 124 or the segmentation network 122. The trained network can be trained using any suitable training data and neural network training technique. In one illustrative example, the network can be a binary gate (e.g., a hard sigmoid or other binary gate) that can be trained end-to-end using a segmentation loss. In some cases, to enforce further sparsity, an average gate value can be added to the loss function.

In other examples, the score can be calculated by comparing and/or focusing on object boundaries in the current frame 202 and the reference frame 204. For example, the score can be calculated by comparing a boundary map from the current frame 202 (e.g., extracted using a fast model) and the boundary map of the segmentation data associated with the reference frame 204. In some cases, the boundary map can include boundary information that is extracted using one or more edge detection filters (e.g., one or more Sobel filters, a pre-trained edge detection neural network, and/or other edge detection). If the two boundary maps differ by a certain amount or beyond a certain amount, the function can return a high score. Otherwise, the function can return a low score.

In some cases, the recycle decision component 210 can generate a score to determine whether to run the segmentation network 122 or the recycle network 124 based on an entire frame. For example, the recycle decision component 210 can compare an entire frame with an entire reference frame to generate a score based on the comparison of the entire frames. In other cases, the recycle decision component 210 can compare sub-regions or sub-portions of frames to generate a score based on the comparison of the sub-regions or sub-portions.

In some cases, the recycle decision component 210 can compute a score based on a comparison of entire frames or entire blocks of frames. In such cases, if the score is between an upper threshold and a lower threshold, the recycle decision component 210 can iteratively compute scores based on smaller regions or portions of the frames to obtain scores reflecting differences at a more granular level and/or regions that are more or less dynamic or static than others. The recycle decision component 210 can continue such an iterative score computation technique until the recycle decision component 210 obtains a score that is above the upper threshold or below the lower threshold. Once the recycle decision component 210 obtains a score that is above the upper threshold or below the lower threshold, the recycle decision component 210 can determine whether to run the segmentation network 122 or the recycle network 124 for the current frame 202 based on the score. In some cases, if the recycle decision component 210 is unable to obtain a score above the upper threshold or below the lower threshold after drilling down on smaller regions or portions, the recycle decision component 210 can default to the segmentation network 122 or the recycle network 124.

Figure 3:
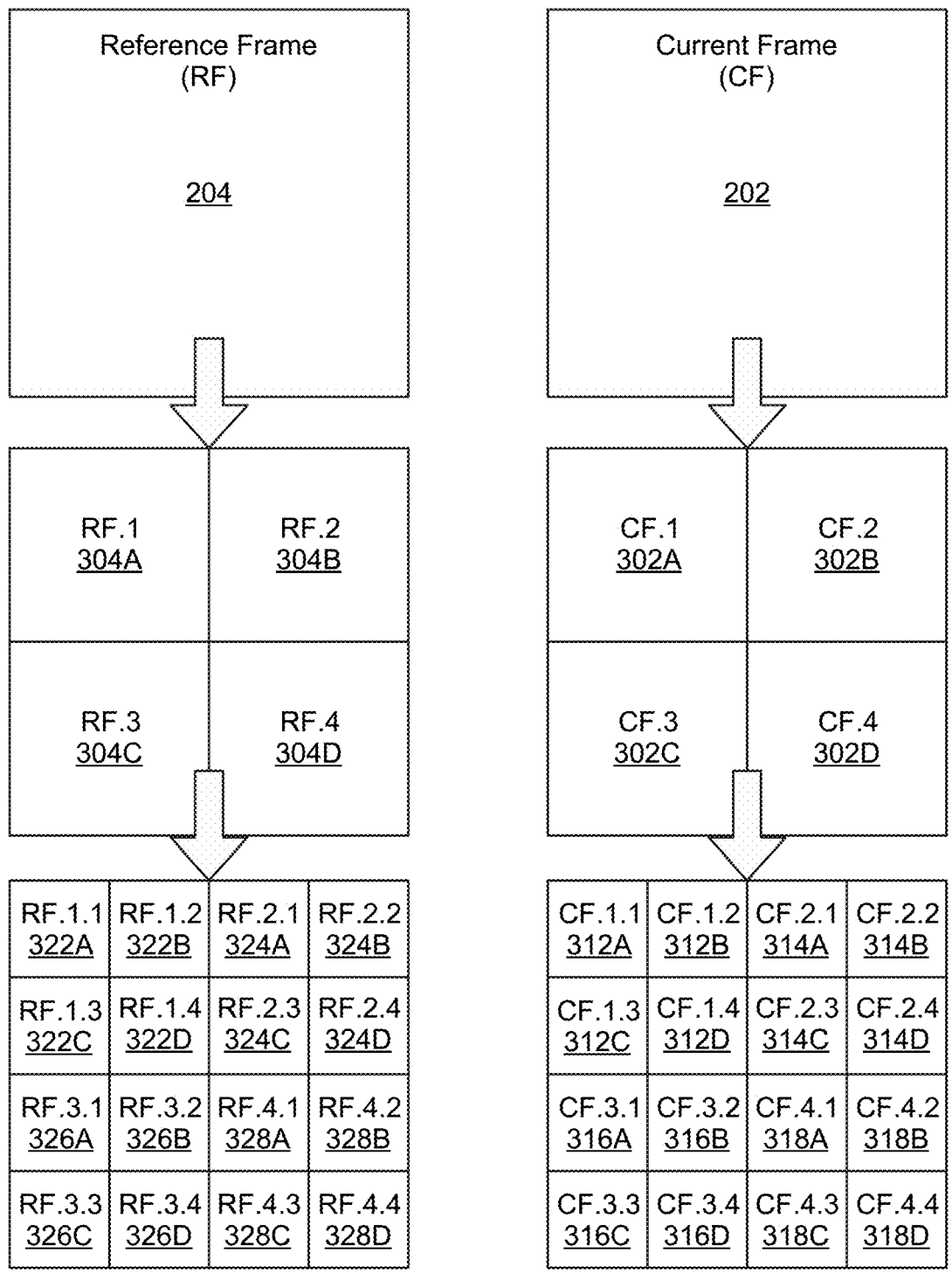
FIG. 3 is a diagram illustrating example score function for determining whether to run a full segmentation network or a recycle network to perform video segmentation for a current frame, in accordance with some examples of the present disclosure.

For example, with reference to FIG. 3, the recycle decision component 210 can first compare the current frame 202 and the reference frame 204 and generate a score. If the recycle decision component 210 determines that the score is above an upper threshold, the recycle decision component 210 can decide to run the segmentation network 122 for the current frame 202. If the recycle decision component 210 determines that the score is below a lower threshold, the recycle decision component 210 can decide to run the recycle network 124. If the score is not above the upper threshold or below the lower threshold (and is thus between the upper and lower thresholds), the recycle decision component 210 can compare smaller regions or blocks of the current frame 202 and the reference frame 204. In this example, the recycle decision component 210 can compare sub-blocks 302A-302D of the current frame 202 with sub-blocks 304A-304D of the reference frame 204 to generate a score based on the sub-blocks 302A-D and 304A-D. If the score then is above an upper threshold, the recycle decision component 210 can decide to run the segmentation network 122 for the current frame 202, and if the score is below a lower threshold, the recycle decision component 210 can decide to run the recycle network 124.

If the score is not above the upper threshold or below the lower threshold, the recycle decision component 210 can compare even smaller regions or blocks of the current frame 202 and the reference frame 204. In this example, the recycle decision component 210 can compare sub-blocks 312A-312D (including sub-block 312A, sub-block 312B, sub-block 312C, and sub-block 312D, collectively referred to herein as "312"), which are sub-blocks of sub-blocks 302A, with sub-blocks 322A-322D (including sub-block 322A, sub-block 322B, sub-block 322C, and sub-block 322D, collectively referred to herein as "322"), which are sub-blocks of sub-block 304A. The recycle decision component 210 can also compare sub-blocks 314A-314D (including sub-block 314A, sub-block 314B, sub-block 314C, and sub-block 314D, collectively referred to herein as "314"), which are sub-blocks of sub-block 302B, with sub-blocks 324A-324D (including sub-block 324A, sub-block 324B, sub-block 324C, and sub-block 324D, collectively referred to herein as "324"), which are sub-blocks of sub-block 304B. Moreover, the recycle decision component 210 can compare sub-blocks 316A-316D (including sub-block 316A, sub-block 316B, sub-block 316C, and sub-block 316D, collectively referred to herein as "316"), which are sub-blocks of sub-block 302C, with sub-blocks 326A-326D (including sub-block 326A, sub-block 326B, sub-block 326C, and sub-block 326D, collectively referred to herein as collectively "326"), which are sub-blocks of sub-block 304C. The recycle decision component 210 can also compare sub-blocks 318A-318D (including sub-block 318A, sub-block 318B, sub-block 318C, and sub-block 318D, collectively referred to herein as collectively "318"), which are sub-blocks of sub-block 302D, with sub-blocks 328A-328D (including sub-block 328A, sub-block 328B, sub-block 328C, and sub-block 328D, collectively referred to herein as "328"), which are sub-blocks of sub-block 304D.

If the score for sub-blocks 312-318 and 322-328 (alone or in combination with the scores for 202, 204 and/or blocks 302A-D and 304A-D) is above the upper threshold, the recycle decision component 210 can decide to run the segmentation network 122 for the current frame 202. If the recycle decision component 210 determines that the score is below the lower threshold, the recycle decision component 210 can decide to run the recycle network 124 for the current frame 202. An example region feature recycling (RFR) score function is illustrated below, where CF is the current frame 202, RF is the reference frame 204, $T_{upper}$ is an upper threshold, and $T_{lower}$ is a lower threshold:

```
RFR (RF, CF, T_upper, T_lower)
{
    If Score(RF, CF) > T_upper:
        RF=CF;
        Return "run segmentation network 122 for CF"
    Else if Score(RF, CF) < T_lower:
        Return "run recycle network 124 for CF"
    Else:
        Return RFR(RF.append(.1), CF.append(.1))
        Return RFR(RF.append(.2), CF.append(.2))
        Return RFR(RF.append(.3), CF.append(.3))
        Return RFR(RF.append(.4), CF.append(.4))
}
```

In some examples, the score function can be defined as or based on an L1 or L2 distance between CF and CR over raw pixels or CNN features (e.g., Score=$\|CNN(CF)-CNN(RF)\|$). The upper threshold $T_{upper}$ and the lower threshold $T_{lower}$ can be hyper-parameters (e.g., which can be set experimentally). In one illustrative example, the value of the upper threshold $T_{upper}$ can be defined as T=0.75*max(CNN(CF)−CNN(RF)) and the value of the lower threshold $T_{upper}$ can be defined as T=0.4*max(CNN(CF)−CNN(RF)).

In some cases, in addition to using image data from the current frame 202 and the reference frame 204 to determine whether to run the segmentation network 122 or the recycle network 124, the recycle decision component 210 can use other sensor data (e.g., from other sensor 106) to help generate a score and/or to determine whether to run the segmentation network 122 or the recycle network 124 on a particular frame. For example, the recycle decision component 210 can also use estimated pose information, measurements from an IMU, measurements from an optical flow sensor, etc.

Returning to FIG. 2, if the recycle decision component 210 determines not to run the recycle network 124 (e.g., because the differences and/or scores between the current frame 202 and the reference frame 204 exceed a threshold), the segmentation network 122 can receive the current frame 202 and process it. Otherwise, if the recycle decision component 210 determines to run the recycle network 124 (e.g., based on the differences and/or scores between the current frame 202 and the reference frame 204 being below the threshold), the recycle network 124 can receive the current frame 202 and process it. In some cases, the recycle decision component 210 can also determine to update the reference frame 204 with the current frame 202 so future decisions to run the segmentation network 122 or the recycle network 124 can be based on, or take account of, the current frame 202 (and/or features associated with the current frame 202) when analyzing a subsequent frame that occurs in the video or other sequence of frames after the current frame 202.

If the recycle decision component 210 determines to run the segmentation network 122, the segmentation network 122 can extract features from the current frame 202 and store the extracted features in a feature store 212 for future use. The features extracted by the segmentation network 122 can include deeper features (e.g., features with a lower spatial resolution and/or obtained from lower levels of the segmentation network 122 as further described below), which can be stored in the feature store 212 for future reuse as described herein. In addition, the segmentation network 122 can generate a segmentation output 222 for the current frame 202 based on the extracted features. In some examples, the segmentation output 222 can include a segmentation map generated for the current frame 202.

If the recycle decision component 210 determines to run the recycle network 124, the recycle network 124 can extract shallow features (e.g., more local, high level and/or higher spatial resolution features) from the current frame 202 and store the extracted features in the feature store 212 for future use. In addition, the recycle network 124 can obtain deeper features from the features store 212. As noted above, the deeper features obtained from the features store 212 can include deeper features generated by the segmentation network 122 from one or more previous frames. The recycle network 124 can recycle the deeper features obtained from the feature store 212 and generate a segmentation output 224 for the current frame 202 based on the shallow features extracted by the recycle network 124 and the deeper features obtained from the features store 212. In some examples, the segmentation output 224 can include a segmentation map generated for the current frame 202.

Figure 4:
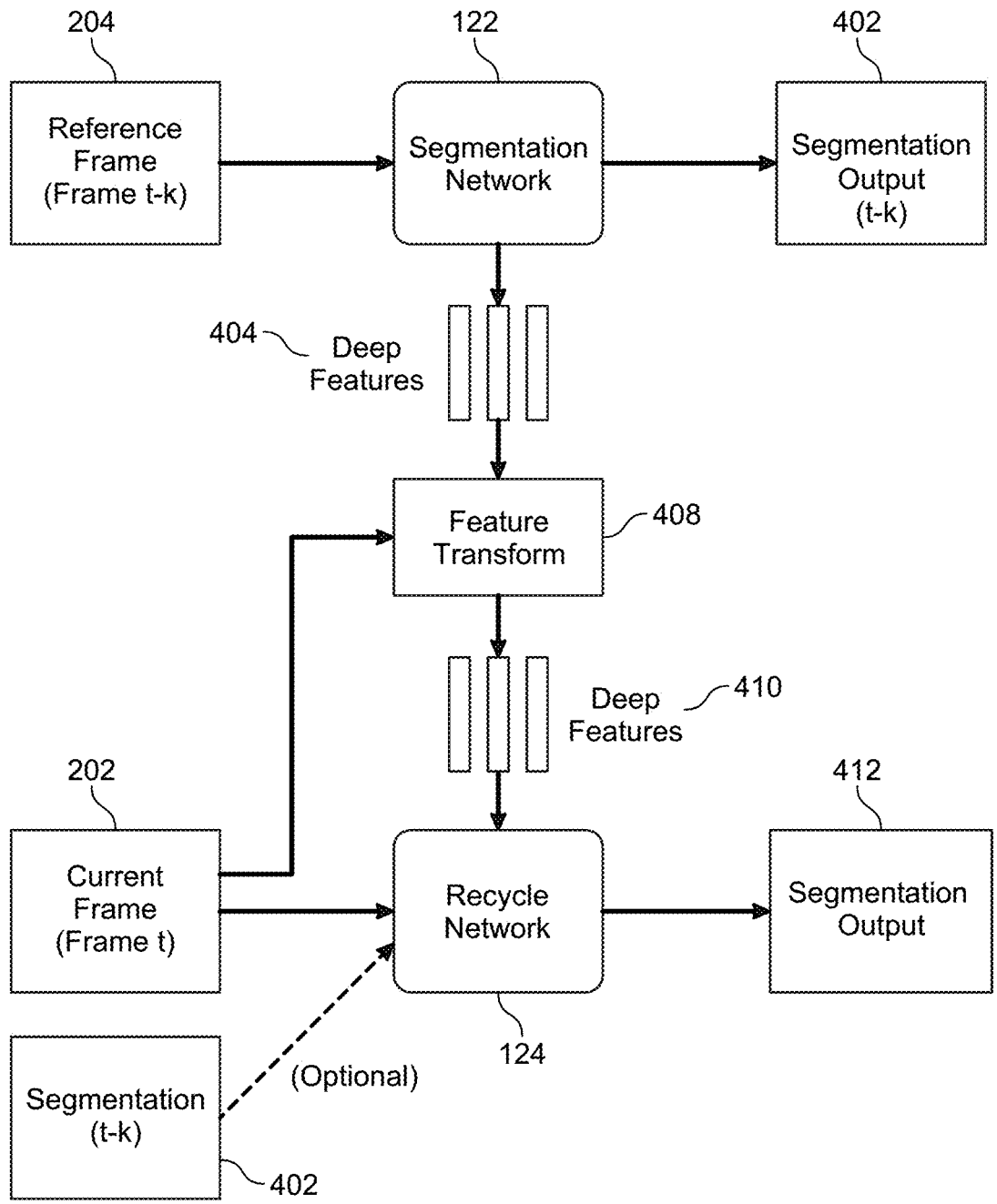
FIG. 4 is a diagram illustrating feature extraction from a reference frame and feature recycling based on features extracted from the reference frame, in accordance with some examples of the present disclosure.

FIG. 4 is a diagram illustrating feature extraction from a reference frame 204 and feature recycling based on features extracted from the reference frame 204. In this example, the segmentation network 122 receives the reference frame 204 and extracts deeper features 404 from the reference frame 204. The deeper features 404 can include lower spatial resolution features. In some examples, the deeper features 404 can include features extracted from one or more deeper or lower levels of the segmentation network 122, as further described below with respect to FIG. 5 and FIG. 7. In some cases, the deeper features 404 can also include features extracted from one or more upper levels of the segmentation network 122.

The segmentation network 122 can generate a segmentation output 402 based on the deeper features 404. In some examples, the segmentation output 402 can include a segmentation map for the reference frame 204. The deeper features 404 can optionally be processed by a feature transform 408 to make adjustments to the deeper features 404 to better fit and/or account for (e.g., better cover, better align to, etc.) changes between the reference frame 204 and the current frame 202 and/or to make the deeper features 404 more robust for reuse for the current frame 202. For example, because the deeper features 404 are from a previous frame (e.g., the reference frame 204), the deeper features 404 may not account for, or include, changes through time between the current frame 202 and the previous frame (e.g., the reference frame 204). Thus, in some cases, the feature transform 408 can enlarge some or all of the deeper features 404 so the deeper features 404 can cover any changes over time, such as movement, between the reference frame 204 and the current frame 202.

To illustrate, if the deeper features 404 correspond to an object which has moved between the reference frame 204 and the current frame 202, such as a moving vehicle, the deeper features 404 would not include the motion between the reference frame 204 and the current frame 202. To account for such motion between the reference frame 204 and the current frame 202, the feature transform 408 can make adjustments to the deeper features 404. For example, the feature transform 408 can enlarge the deeper features 404 so the deeper features 404 are larger and can potentially cover the object's movement in the current frame 202. As another example, the feature transform 408 can make adjustments to the deeper features 404 on a direction basis to account for and/or cover changes in direction between the reference frame 204 and the current frame 202.

In some examples, the feature transform 408 can be part of, or implemented by, the segmentation network 122. In other examples, the feature transform 408 can be a separate network. Moreover, in some cases, the feature transform 408 can include convolution layers, which the feature transform 408 can use to perform convolutions on the deeper features 404. After processing the deeper features 404, the feature transform 408 can output deeper features 410 with one or more adjustments as previously described.

When running the recycle network 124 to process a current frame 202, the recycle network 124 can receive the current frame 202 and the deeper features 410 (or the deeper features 404 if the feature transform 408 is not applied to the deeper features 404) from the segmentation network 122 and generate a segmentation output 412. The segmentation output 412 can be based on one or more features extracted by the recycle network 124 from the current frame 202 and the deeper features 404 or 410 extracted by the segmentation network 122 from the reference frame 204, which are recycled (e.g., reused) by the recycle network 124 for the current frame 202. In some examples, the segmentation output 412 can include a segmentation map for the current frame 202.

In some cases, to generate the segmentation output 412, the recycle network 124 can optionally use segmentation data from one or more previous frames. For example, the recycle network 124 can use the segmentation output 402 generated by the segmentation network 122 based on the reference frame 204. The segmentation data can include one or more segmentation maps from one or more previous frames. Moreover, the segmentation data can include previous segmentation data generated by the segmentation network 122 and/or the recycle network 124. The recycle network 124 can use the segmentation data in combination with the current frame 202 (e.g., and/or one or more features from the current frame 202) and the deeper features 404 or 410 from the segmentation network 122, to generate the segmentation output 412.

FIG. 5 is a diagram illustrating an example system for video segmentation and feature recycling from a reference frame 204 to a current frame 202. In this example, at a top layer of the segmentation network 122, an encoder 504 (e.g., E 1.1 where 1 represents a level of the segmentation network 122 and 0.1 represents a depth in the segmentation network 122) performs a convolution on features 502 from the reference frame 204 and outputs the features 502 to a transition layer 506. In some examples, an encoder in FIG. 5 can represent or include a residual convolution block.

The transition layer 506 performs a convolutional-based transition to transition the features 502 from the encoder 504 to a lower (e.g., deeper) level of the segmentation network 122. For example, the transition layer 506 performs a convolutional-based transition to transition the features 502 from the encoder 504 to encoder 532 at a lower level of the segmentation network 122. The transition layer 506 can transition the features 502 from the encoder 504 to the encoder 510 at the top level, which performs a convolution on the features 502 and outputs the features 502 to a next transition layer 512. In some examples, to transition the features 502 from the encoder 504 to the encoder 532 at the lower level, the transition layer 506 can perform a convolution with a stride greater than 1 (such as a stride 2 or greater than 2 for example) on the features 502 to generate deeper features 530 for the lower level of the segmentation network 122. Given the stride greater than one used to generate the features 502, the deeper features 530 at the lower level of the segmentation network 122 can have a lower spatial resolution. In some examples, the deeper features 530 can be down-sampled features (e.g., based on the stride greater than one) relative to the features 502.

At the lower level, the encoder 532 obtains deeper features 530 from the transition layer 506 and performs a convolution on the deeper features 530. The encoder 532 can then output the deeper features 530 to the next transition layer 512. In some cases, the encoder 532 can optionally provide the deeper features 530 to a feature transform 408. In other cases, the encoder 532 can optionally provide the deeper features 530 to transition layer 568 at the recycle network 124 (or to a feature store from which the recycle network 124 can retrieve them).

The transition layer 512 performs a convolutional-based transition to transition the deeper features 530 from the encoder 532 to a next lower level (e.g., deeper) of the segmentation network 122. For example, the transition layer 512 performs a convolutional-based transition to transition the deeper features 530 from the encoder 532 to encoder 542 at the lower level of the segmentation network 122. The transition layer 512 can transition the features 502 from the encoder 510 to the encoder 514 at the top level, which performs a convolution on the features 502 and outputs the features 502 to a next transition layer 516, and the deeper features 530 from the encoder 532 to the encoder 534, which performs a convolution on the deeper features 530 and outputs the deeper features 530 to the next transition layer 516. In some cases, the encoder 534 can also provide the deeper features 530 to the feature transform 408 or a transition layer 572 at the recycle network 124 (or to a feature store from which the recycle network 124 can retrieve them).

In some examples, to transition the deeper features 530 from the encoder 532 to the encoder 542 at the next lower level, the transition layer 512 can generate deeper features 530 for the lower level of the segmentation network 122 by perform a convolution on the deeper features 530 with a stride greater than the stride used to generate the deeper features 530. Given the stride greater than one used to generate the deeper features 530, the deeper features 540 at the next lower level of the segmentation network 122 can have a lower spatial resolution. In some examples, the deeper features 540 can be down-sampled features (e.g., based on the stride) relative to the features 502 and the deeper features 530.

At the next lower level of the segmentation network 122, the encoder 542 performs a convolution on the deeper features 540 (which have a larger stride and lower spatial resolution as previously mentioned) and outputs the deeper features 540 to the next transition layer 516. In some examples, the encoder 542 can also provide the deeper features 540 to the feature transform 408 or a transition layer 572 at the recycle network 124 (or to a feature store from which the recycle network 124 can retrieve them).

The transition layer 516 performs a convolutional-based transition to transition the deeper features 540 to a bottom level of the segmentation network 122. For example, the transition layer 516 performs a convolutional-based transition to transition the deeper features 540 from the encoder 542 to encoder 552 at the bottom level of the segmentation network 122. The transition layer 516 can transition the features 502 from the encoder 514 to the encoder 518 at the top level, which performs a convolution on the features 502 and outputs the features 502 to a collector 520. The transition layer 516 can also transition the deeper features 530 from the encoder 534 to the encoder 536 at the lower level, which performs a convolution on the deeper features 530 and outputs deeper features 530 with bilinear up-sampling to the collector 520. The transition layer 516 can transition the deeper features 540 from the encoder 542 to the encoder 552 at the next lower level, which performs a convolution on the deeper features 540 and outputs deeper features 540 with bilinear up-sampling to the collector 520.

In some examples, to transition the deeper features 540 from the encoder 542 to the encoder 552 at the bottom level, the transition layer 516 can generate the deeper features 550 by performing a convolution on the deeper features 540 with a stride greater than the stride used to generate the deeper features 540. Given the larger stride, the deeper features 550 at the bottom level of the segmentation network 122 can have a lower spatial resolution. In some examples, the deeper features 550 can be down-sampled features (e.g., based on the stride) relative to the features 502, the deeper features 530 and the deeper features 540.

At the bottom level of the segmentation network 122, the encoder 552 performs a convolution on the deeper features 550 and outputs deeper features 550 with bilinear up-sampling to the collector 520. In some examples, the encoders 536, 544, and/or 552 can also provide the deeper features 530, 540 and/or 550 to a collector 576 at the recycle network 124 (or to a feature store from which the recycle network 124 can retrieve them).

The collector 520 at the segmentation network 122 can collect the features 502, the deeper features 530, the deeper features 540, and the deeper features 550 from the various levels of the segmentation network 122, and provide the collected features to encoder 522. In some examples, the collector 520 can fuse and/or concatenate the features 502, deeper features 530, deeper features 540, and deeper features 550 prior to providing them to the encoder 522. The encoder 522 can perform a convolution on the features 502, deeper features 530, deeper features 540, and deeper features 550, and generate deeper features 554. The segmentation network 122 can generate a segmentation output 556 (e.g., a segmentation map) based on the deeper features 554.

In addition, as shown in FIG. 5, recycle network 124 can process a current frame 202 to generate a segmentation output at least partially based on recycled features from the segmentation network 122 (e.g., deeper features). In this example, an encoder 562 (e.g., E 1.1 where 1 represents a level of the recycle network 124 and 0.1 represents a depth in the recycle network 124) performs a convolution on features 560 from the current frame 202 and outputs the features 560 to a transition layer 564. In some cases, the encoder 562 can perform a convolution based on the features 560 as well as previous segmentation data 558 determined for one or more previous frames (e.g., reference frame 204 and/or one or more other reference frames). In some examples, the encoder 562 can represent or include a residual convolution block.

The transition layer 564 transitions the features 560 from the encoder 562 to the encoder 566. In some examples, the transition layer 564 may be empty and/or may only provide a connection from the encoder 562 to the encoder 566. In other examples, the transition layer 564 can perform a convolution when transitioning the features 560 from the encoder 562 to the encoder 566.

The encoder 566 performs a convolution on the features 560 and outputs the features 560 to a next transition layer 568. The next transition layer 568 transitions the features 560 from the encoder 566 (and optionally the deeper features 530 from the segmentation network 122) to encoder 570. In some examples, the transition layer 568 may be empty and/or may only provide a connection from the encoder 566 to the encoder 570. In other examples, the transition layer 568 can perform a convolution when transitioning the features 560 from the encoder 566 to the encoder 570.

The encoder 570 performs a convolution on the features 560 and outputs the features 560 to a next transition layer 572. The next transition layer 572 transitions the features 560 from the encoder 570 (and optionally the deeper features 530 and 540 from the segmentation network 122) to the encoder 574. In some examples, the next transition layer 572 may be empty and/or may only provide a connection from the encoder 570 to the encoder 574. In other examples, the next transition layer 572 can perform a convolution when transitioning the features 560 from the encoder 570 to the encoder 574.

The encoder 574 performs a convolution on the features 560 and outputs the features 560 to a collector 576. The collector 576 can collect the features 560 and any of the deeper features 530, 540, and 550 from the segmentation network 122, and provide the collected features to the encoder 578. In some examples, the collector 576 can fuse and/or concatenate the features 560 and any of the deeper features 530, 540, and 550 from the segmentation network 122 prior to providing the collected features to the encoder 578.

The encoder 578 performs a convolution and generates output features 580. In some examples, the output features 580 can include a feature map(s). Moreover, the recycle network 124 can generate a segmentation output 582 based on the output features 580. In some examples, the segmentation output 582 can include one or more segmentation maps.

In some examples, before the deeper features 530, 540, and/or 550 from the segmentation network 122 are provided to the transition layers 568, 572 and/or the collector 576 at the recycle network 124, the feature transform 408 can optionally perform a feature transformation on the deeper features 530, 540, and/or 550, as previously described. Moreover, in some cases, any of the encoders 562, 566, 570, 574, 578 in the recycle network 124 can have the same respective parameters/coefficients as the encoders 504, 510, 514, 518, and 522 in the segmentation network 122. In other cases, any of the encoders 562, 566, 570, 574, 578 in the recycle network 124 can have the different respective parameters/coefficients than the encoders 504, 510, 514, 518, and 522 in the segmentation network 122.

Figure 6:
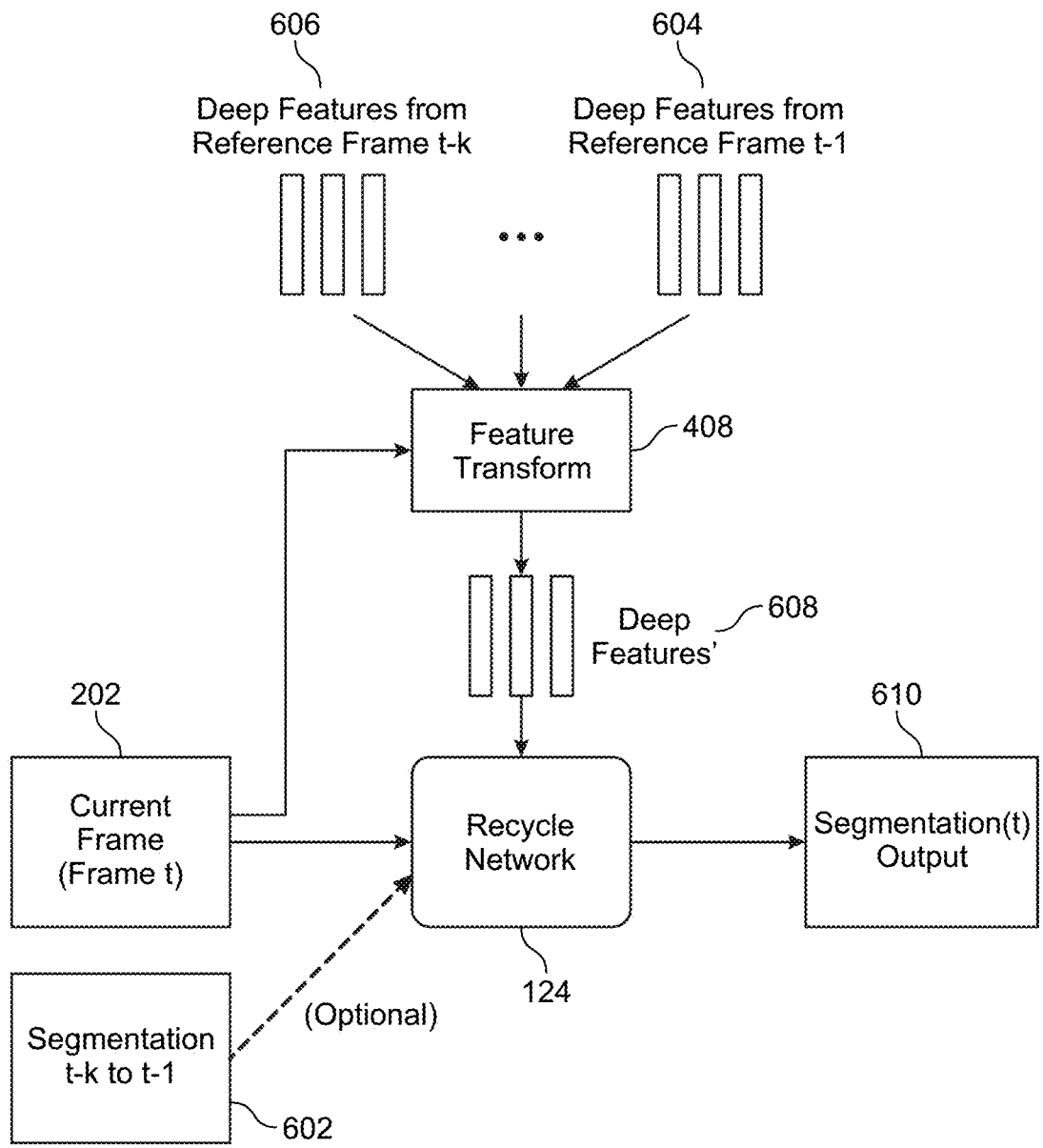
FIG. 6 is a diagram illustrating feature recycling from multiple reference frames to generate a segmentation output for a current frame, in accordance with some examples of the present disclosure.

FIG. 6 is a diagram illustrating feature recycling from multiple reference frames to generate a segmentation output for a current frame. In this example, the feature transform 408 can optionally process deeper features 604 from a reference frame and deeper features 606 from one or more older reference frames. The deeper features 604 and 606 can include lower spatial resolution features generated at lower levels of the segmentation network 122 (e.g., one or more levels below a top level), as previously described. In some examples, the feature transform 408 can make adjustments to the deeper features 604, 606 as previously described, and generate deeper features 608.

The recycle network 124 can receive the current frame 202 and the deeper features 608 (or the deeper features 604 and 606 if the feature transform 408 is not applied to the deeper features 604 and 606) and generate a segmentation output 610. The segmentation output 610 can be based on one or more features extracted by the recycle network 124 from the current frame 202 and the deeper features 608 (or the deeper features 604 and 606), which are recycled (e.g., reused) by the recycle network 124 for the current frame 202. In some examples, the segmentation output 610 can include a segmentation map for the current frame 202.

In some cases, to generate the segmentation output 610, the recycle network 124 can optionally use segmentation data 602 from one or more previous frames. In this example, the segmentation data 602 includes segmentation data generated from multiple frames. The segmentation data 602 can include segmentation maps from previous frames. Moreover, the segmentation data 602 can include previous segmentation data generated by the segmentation network 122 and/or the recycle network 124. The recycle network 124 can use the segmentation data 602 in combination with the current frame 202 (e.g., and/or one or more features from the current frame 202) and the deeper features 608 (or 604 and 606) to generate the segmentation output 610.

FIG. 7 is a diagram illustrating an example system for video segmentation and feature recycling from reference frames 702 to a current frame 202. In this example, at the top level of the segmentation network 122, the encoder 504 performs a convolution on features 704 from the reference frames 702 and outputs the features 704 to the transition layer 506.

The transition layer 506 performs a convolutional-based transition to transition the features 704 from the encoder 504 to a lower level of the segmentation network 122. For example, the transition layer 506 performs a convolutional-based transition to transition the features 704 from the encoder 504 to encoder 532 at the lower level of the segmentation network 122. The transition layer 506 can also transition the features 704 from the encoder 504 to the encoder 510 at the top level, which performs a convolution on the features 704 and outputs the features 704 to a next transition layer 512. In some examples, to transition the features 704 from the encoder 504 to the encoder 532 at the lower level, the transition layer 506 can perform a convolution with a stride greater than 1 (such as a stride 2 or greater than 2 for example) on the features 704 to generate deeper features 706 for the lower level of the segmentation network 122. Given the stride greater than the one used to generate the features 704, the deeper features 706 at the lower level of the segmentation network 122 can have a lower spatial resolution. In some examples, the deeper features 706 can be down-sampled features (e.g., based on the stride greater than one) relative to the features 704.

At the lower level, the encoder 532 obtains the deeper features 706 with the larger stride from the transition layer 506 and performs a convolution on the deeper features 706. The encoder 532 can then output the deeper features 706 to the next transition layer 512. In some cases, the encoder 532 can provide the deeper features 706 to the feature transform 408, which can process the deeper features 706 and store the deeper features 706 in a deeper feature recycle bin 732.

The transition layer 512 performs a convolutional-based transition to transition the deeper features 706 from the encoder 532 to a next lower level of the segmentation network 122. For example, the transition layer 512 performs a convolutional-based transition to transition the deeper features 706 from the encoder 532 to encoder 542 at the next lower level of the segmentation network 122. The transition layer 512 can also transition the features 704 from the encoder 510 to the encoder 514 at the top level, which performs a convolution on the features 704 and outputs the features 704 to a next transition layer 516. The transition layer 512 can transition the deeper features 706 from the encoder 532 to the encoder 534 at the lower level, which performs a convolution on the deeper features 706 and outputs the deeper features 706 to the next transition layer 516. In some examples, to transition the deeper features 706 from the encoder 532 to the encoder 542 at the next lower level, the transition layer 512 can generate deeper features 708 by performing a convolution with a larger stride than the stride used to generate the deeper features 706. Given the larger stride, the deeper features 708 at the next lower level of the segmentation network 122 can have a lower spatial resolution. In some examples, the deeper features 708 can be down-sampled features (e.g., based on the stride greater than one) relative to the features 704 and the deeper features 706.

In some examples, the encoder 534 can also provide the deeper features 706 to the feature transform 408, which can process the deeper features 706 and store the deeper features 706 in a deeper feature recycle bin 734. Similarly, in some examples, the encoder 542 can provide the deeper features 708 to the feature transform 408, which can process the deeper features 708 and store the deeper features 708 in a deeper feature recycle bin 734.

At the next lower level of the segmentation network 122, the encoder 542 performs a convolution on the deeper features 708 (which have a larger stride and lower spatial resolution as previously mentioned) and outputs the deeper features 708 to the next transition layer 516. In some examples, the encoder 542 can provide the deeper features 708 to the feature transform 408, which can process the deeper features 708 as previously described, and store the deeper features 708 in a deeper feature recycle bin 734.

The transition layer 516 performs a convolutional-based transition to transition the features 708 from the encoder 542 to a bottom level of the segmentation network 122. For example, the transition layer 516 performs a convolutional-based transition to transition the features 708 from the encoder 542 to encoder 552 at the bottom level of the segmentation network 122. The transition layer 516 can also transition the features 704 from the encoder 514 to the encoder 518 at the top level, which performs a convolution on the features 704 and outputs the features 704 to a collector 520. The transition layer 516 can transition the deeper features 706 from the encoder 534 to the encoder 536 at the lower level, which outputs the deeper features 706 with bilinear up-sampling to the collector 520. The transition layer 516 can transition the deeper features 708 from the encoder 542 to the encoder 544, which provides the deeper features 708 with bilinear up-sampling to the collector 520.

In some examples, to transition the deeper features 708 from the encoder 542 to the encoder 552 at the bottom level, the transition layer 516 can generate deeper features 710 by performing a convolution with a larger stride on the deeper features 708. Given the larger stride, the deeper features 710 at the bottom level of the segmentation network 122 can have a lower spatial resolution. In some examples, the deeper features 710 can be down-sampled features (e.g., based on the stride greater than one) relative to the features 704, the deeper features 706, and the deeper features 708.

In some examples, the encoders 536, 544, and/or 552 can provide the deeper features 706, 708, and/or 710 to the feature transform 408, which can process the deeper features 706, 708, and/or 710 and store the deeper features 706, 708, and/or 710 in a deeper feature recycle bin 736.

The collector 520 at the segmentation network 122 can collect the features 704, the deeper features 706, the deeper features 708, and the deeper features 710 from the various levels of the segmentation network 122, and provide the collected features to encoder 522. In some examples, prior to providing the features 704, deeper features 706, deeper features 708 and deeper features 710 to the encoder 522, the collector 520 can fuse and/or concatenate the features 704, deeper features 706, deeper features 708 and deeper features 710. The encoder 522 can perform a convolution on the features 704, deeper features 706, deeper features 708 and deeper features 710 and generate deeper features 712. The segmentation network 122 can generate a segmentation output 714 (e.g., a segmentation map) based on the deeper features 712, and store the segmentation output 714 in a segmentation map pool 720.

In addition, as shown in FIG. 7, recycle network 124 can process a current frame 202 to generate a segmentation output at least partially based on recycled features from the segmentation network 122 (e.g., deeper features). In this example, a fusion block 724 in the recycle network 124 can obtain segmentation data (e.g., one or more segmentation maps) from the segmentation map pool 720, which can contain segmentation maps from previous frames, and perform a pooling operation on the input segmentation data to generate pooled segmentation data, which can include one or more segmentation maps. In some examples, the pooling operation can create one or more down sampled or pooled segmentation maps. In some cases, the pooled segmentation data can provide a representation of the input segmentation data, such as a summarized version of the input segmentation data.

In some examples, the fusion block 724 can combine/concatenate the pooled segmentation data from the pooling operation with the features 722 from the current frame 202, and provide the output features as input to the encoder 562. The encoder 562 can then perform a convolution on the input features to create feature maps that summarize the presence of features in the input. The encoder 562 can output the generated features 722 to encoder 566. Encoder 566 can similarly perform a convolution on the features and provide the output features 722 to a fusion block 726.

The fusion block 726 can obtain deeper features from the deeper feature recycle bin 732, and perform a pooling operation on the deeper features from the deeper feature recycle bin 732 and the features 722 from encoder 566 to obtain pooled features. In some examples, the deeper features from the deeper feature recycle bin 732 can include the deeper features 706 generated by encoder 532 of the segmentation network 122 and optionally processed by the feature transform 408, as previously described. Moreover, the pooled features can provide a representation of the deeper features 706 from the deeper feature recycle bin 732. In some cases, the fusion block 726 can combine/concatenate the pooled features with the features 722 from the encoder 566, and output features used as an input of the encoder 570. Moreover, in some examples, the fusion block 726 can perform a convolution-based fusion operation on the deeper features 706 from the deeper feature recycle bin 732 and the features 722 from encoder 566, and store the fused feature maps generated by the fusion operation in the deeper feature recycle bin 732 for future use.

The encoder 570 can perform a convolution on the input features received from the fusion block 726, and provide the output features 722 to a fusion block 728. The fusion block 728 can obtain deeper features from the deeper feature recycle bin 734, and perform pooling operations on the deeper features from the deeper feature recycle bin 732. In some examples, the deeper features from the deeper feature recycle bin 734 can include the deeper features 706 generated by encoder 534 of the segmentation network 122 and optionally processed by the feature transform 408, as well as the deeper features 708 generated by encoder 542 of the segmentation network 122 and optionally processed by the feature transform 408.

The pooled features can provide representations of the deeper features 706 and 708 from the deeper feature recycle bin 732. In some cases, the fusion block 728 can combine/concatenate the pooled features with the features 722 from the encoder 570, and output features used as an input of the encoder 574. Moreover, in some examples, the fusion block 728 can perform a convolution-based fusion operation on the deeper features 706 from the deeper feature recycle bin 734 and the features 722 from encoder 570, and a convolution-based fusion operation on the deeper features 708 from the deeper feature recycle bin 734 and the features 722 from encoder 570. The fusion block 728 can then store the fused feature maps generated by the fusion operations in the deeper feature recycle bin 732 for future use.

The encoder 574 can receive the input features from the fusion block 728 and perform a convolution on the input features to generate output features 722 providing a representation of the input features. The output features 722 from the encoder 574 be used as an input to fusion block 730. The fusion block 730 can obtain deeper features from the deeper feature recycle bin 736, and perform pooling operations on the deeper features from the deeper feature recycle bin 736 and the features 722 from encoder 574 to obtain pooled features.

In some examples, the deeper features from the deeper feature recycle bin 736 can include the deeper features 706 generated by encoder 536 of the segmentation network 122 and optionally processed by the feature transform 408, the deeper features 708 generated by encoder 544 of the segmentation network 122 and optionally processed by the feature transform 408, and the deeper features 710 generated by encoder 552 of the segmentation network 122 and optionally processed by the feature transform 408. The pooled features can provide representations of the deeper features 706, 708, and 710 from the deeper recycle bin 736.

In some cases, the fusion block 730 can combine/concatenate the pooled features with the features 722 from the encoder 574, and output features used as an input of the encoder 578. Moreover, in some examples, the fusion block 730 can perform a convolution-based fusion operation on the deeper features 706 from the deeper feature recycle bin 736 and the features 722 from encoder 574, a convolution-based fusion operation on the deeper features 708 from the deeper feature recycle bin 736 and the features 722 from encoder 574, and a convolution-based fusion operation on the deeper features 710 from the deeper feature recycle bin 736 and the features 722 from encoder 574. The fusion block 730 can then store the fused feature maps generated by the fusion operations in the deeper feature recycle bin 736 for future use.

The encoder 578 can receive the input features from the fusion block 730 and perform a convolution on the input features to generate segmentation output 740. The segmentation output 740 can include one or more segmentation maps generated by the recycle network 124. In some examples, the recycle network 124 can store the segmentation output 740 in the segmentation map pool 720 for future use.

Figure 8A:
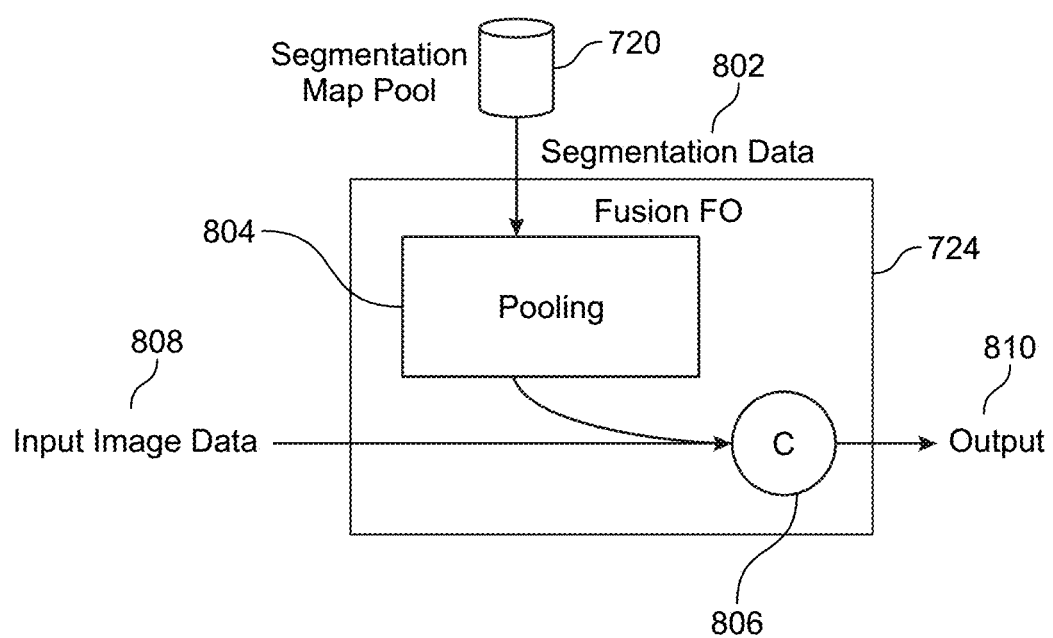
FIGS. 8A through 8D are diagrams illustrating example fusion blocks implemented by a recycle network, in accordance with some examples of the present disclosure.

FIGS. 8A through 8D are diagrams illustrating example fusion blocks implemented by the recycle network 124. In FIG. 8A, the fusion block 724 can obtain segmentation data 802 (e.g., one or more segmentation maps) from the segmentation map pool 720 and perform a pooling operation 804 on the segmentation data 802 to generate pooled segmentation data, which can include one or more pooled segmentation maps. In some examples, the pooling operation 804 can create one or more down sampled or pooled segmentation maps. In some cases, the output segmentation data can provide a representation of the input segmentation data 802, such as a summarized version of the input segmentation data 802.

A concatenator 806 of the fusion block 724 can receive input image data 808 associated with the current frame 202 and the pooled segmentation data generated by the pooling operation 804, and combine/concatenate the input image data 808 with the pooled segmentation data from the pooling operation 804 to generate an output 810 (e.g., the input to encoder 562 in FIG. 7). In some examples, the input image data 808 can include features (e.g., features 722) in the current frame 202. Moreover, the output 810 can include one or more feature maps generated from the input image data 808 and the pooled segmentation data from the pooling operation 804.

Figure 8B:
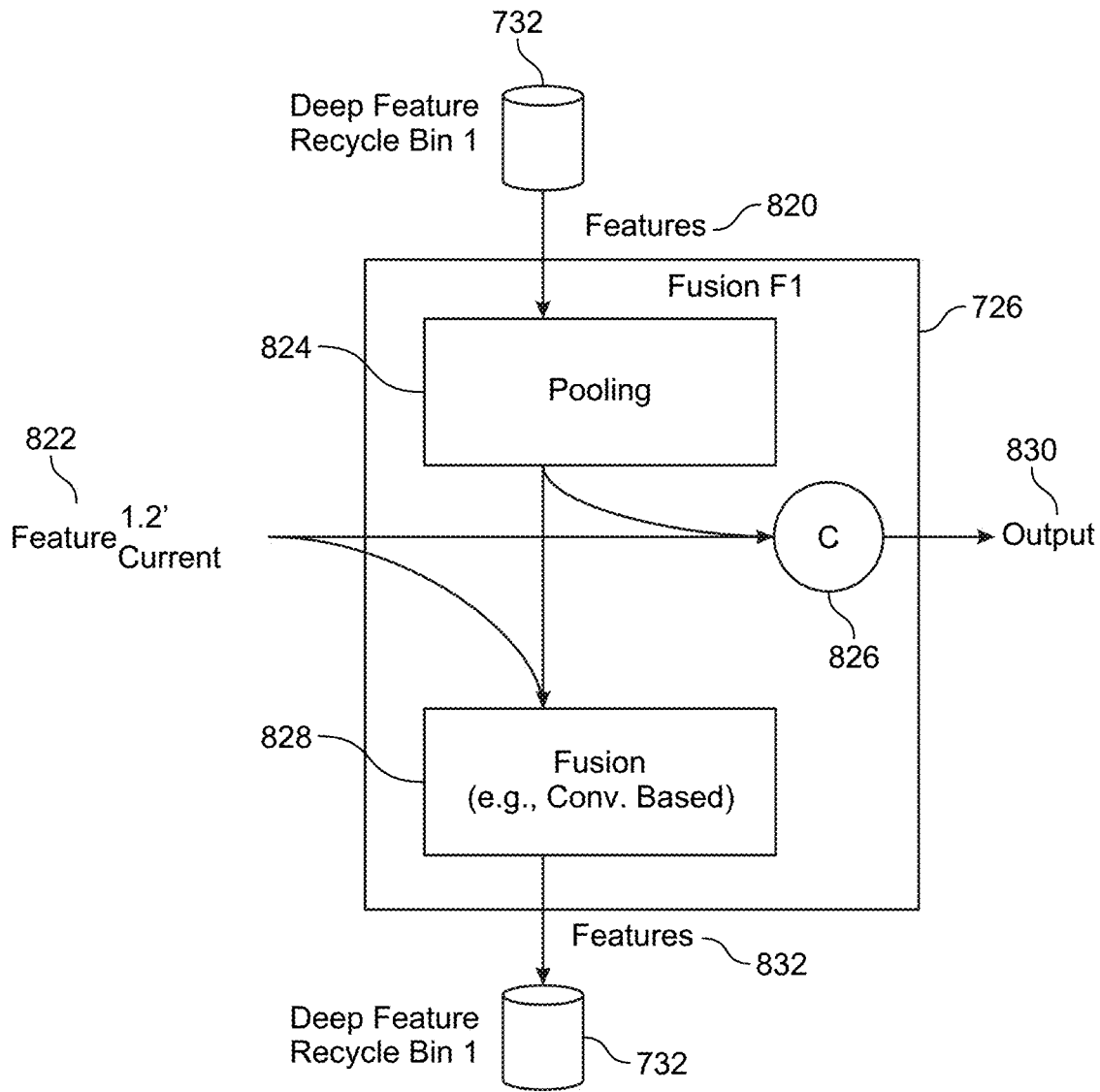

In FIG. 8B, the fusion block 726 can obtain deeper features 820 from the deeper feature recycle bin 732, and perform a pooling operation 824 on the deeper features 820 from the deeper feature recycle bin 732 and input features 822 associated with the current frame 202, to obtain pooled features. In some examples, the deeper features 820 can include the deeper features 706 generated by encoder 532 of the segmentation network 122 and optionally processed by the feature transform 408. In some examples, the input features 822 can include the features 722 generated by encoder 566 in the recycle network 124.

A concatenator 826 of the fusion block 726 can receive the input features 822 and the pooled features generated by the pooling operation 824, and combine/concatenate the input features 822 and the pooled features to generate an output 830 (e.g., the input to encoder 570 in FIG. 7). In some examples, the output 830 can include one or more feature maps generated from the input features 822 and the pooled features.

Moreover, the fusion block 726 can perform a convolution-based fusion operation 828 on the input features 822 and the pooled features generated by the pooling operation 824, and store the result in the deeper feature recycle bin 732 for future use. The result can include features 832 (e.g., feature maps) fused by the fusion operation 828 based on the input features 822 and the pooled features from the pooling operation 824.

Figure 8C:
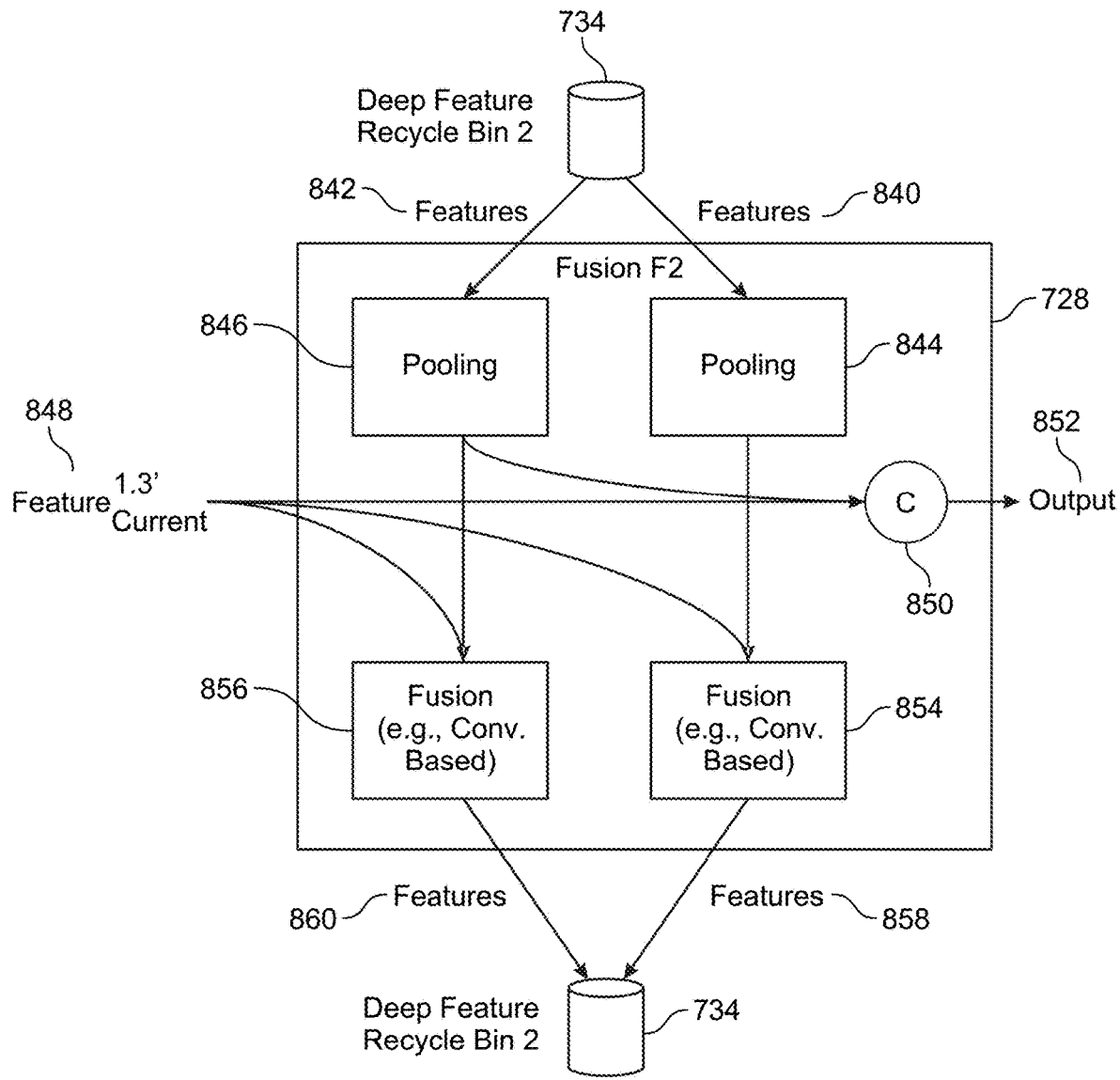

In FIG. 8C, the fusion block 728 can obtain deeper features 840 and 842 from the deeper feature recycle bin 734, and perform pooling operations 844 and 846 on the deeper features 840 and 842 to generate sets of pooled features. In some examples, the deeper features 840 can include the deeper features (e.g., deeper features 706) generated by encoder 534 of the segmentation network 122 and optionally processed by the feature transform 408, and the deeper features 842 can include the deeper features (e.g., deeper features 708) generated by encoder 542 of the segmentation network 122 and optionally processed by the feature transform 408.

In some examples, the fusion block 728 can perform a pooling operation 844 on the deeper features 840 to generate a first set of pooled features. The fusion block 728 can also perform a pooling operation 846 on the deeper features 842 to generate a second set of pooled features. The sets of pooled features from the pooling operations 844 and 846 can include the first and second sets of pooled features. In some examples, the sets of pooled features can provide representations of the deeper features 840 and 842 from the deeper feature recycle bin 734.

A collector 850 in the fusion block 728 can receive input features 848 and combine/concatenate the input features 848 with the sets of pooled features from the pooling operations 844 and 846 to generate an output 852 (e.g., the input to encoder 574 in FIG. 7). In some examples, the output 852 can include one or more feature maps generated from the input features 822 and the sets of pooled features from the pooling operations 844 and 846.

Moreover, the fusion block 728 can perform convolution-based fusion operations 854 and 856 on the input features 848 and the sets of pooled features from the pooling operations 844 and 846. For example, the fusion block 728 can perform a convolution-based fusion operation 854 on the input features 848 and a set of pooled features from the pooling operation 844, and generate output features 858. Similarly, the fusion block 728 can perform a convolution-based fusion operation 856 on the input features 848 and a set of pooled features from the pooling operation 846, and generate output features 860. The fusion block 728 can then store the output features 858 and 860 on the deeper feature recycle bin 734 for future use.

In some examples, the output features 858 can include one or more feature maps generated by fusing the input features 848 with the set of pooled features from the pooling operation 844. Similarly, the output features 860 can include one or more feature maps generated by fusing the input features 848 with the set of pooled features from the pooling operation 846.

Figure 8D:
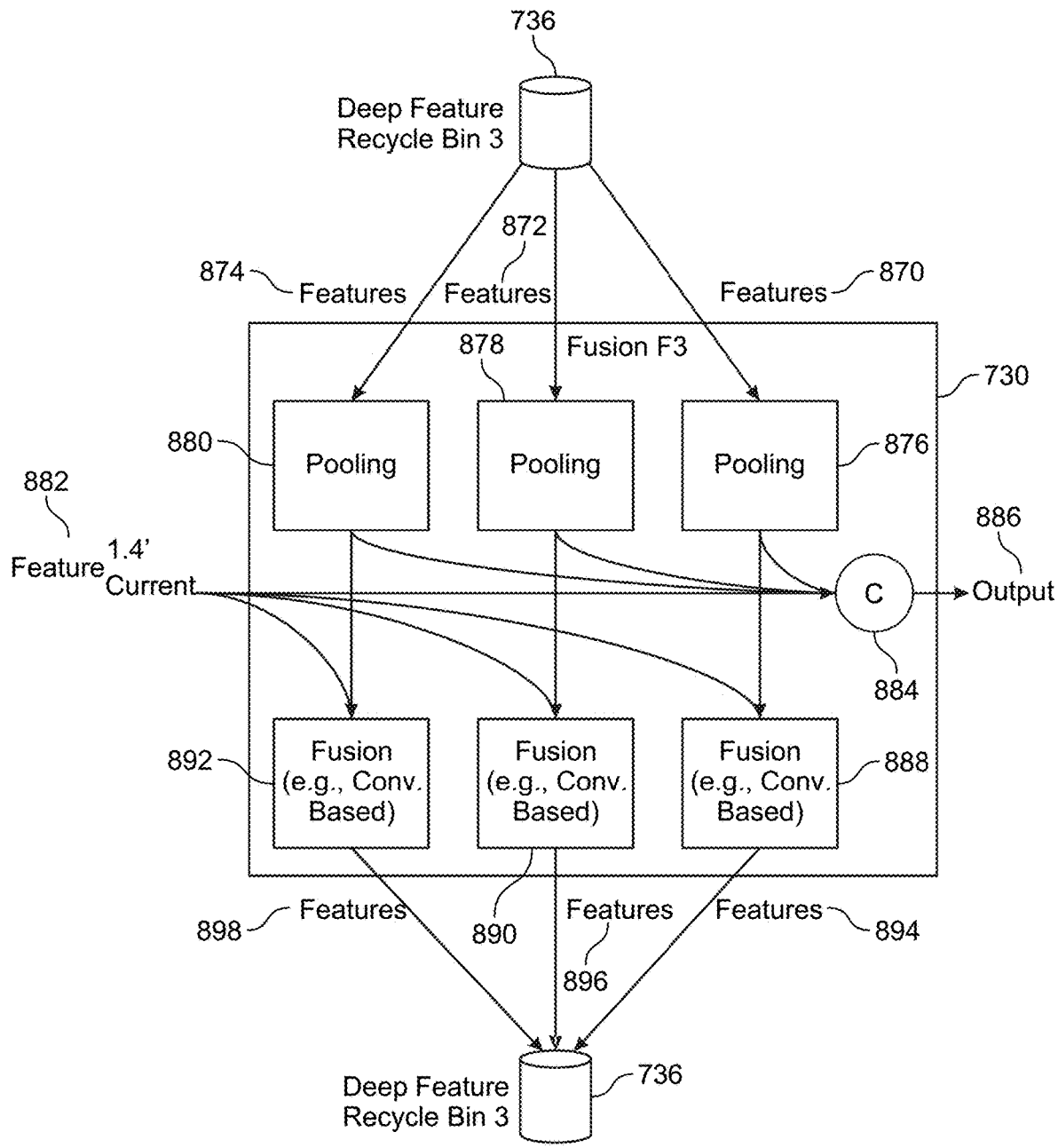

In FIG. 8D, the fusion block 730 can obtain deeper features 870, 872, 874 from the deeper feature recycle bin 736, and perform pooling operations 876, 878, 880 on the deeper features 870, 872, 874 to generate sets of pooled features. In some examples, the deeper features 870 can include the deeper features (e.g., deeper features 706) generated by encoder 536 of the segmentation network 122 and optionally processed by the feature transform 408, the deeper features 872 can include the deeper features (e.g., deeper features 708) generated by encoder 544 of the segmentation network 122 and optionally processed by the feature transform 408, and the deeper features 874 can include the deeper features (e.g., deeper features 710) generated by encoder 552 of the segmentation network 122 and optionally processed by the feature transform 408.

In some examples, the fusion block 730 can perform a pooling operation 876 on the deeper features 870 to generate a first set of pooled features. The fusion block 730 can also perform a pooling operation 878 on the deeper features 872 to generate a second set of pooled features, and a pooling operation 880 on the deeper features 874 to generate a third set of pooled features. The sets of pooled features from the pooling operations 876, 878, 880 can include the first, second and third sets of pooled features. In some examples, the sets of pooled features can provide representations of the deeper features 870, 872, 874 from the deeper recycle bin 736.

A collector 884 in the fusion block 730 can receive input features 882 and combine/concatenate the input features 882 with the sets of pooled features from the pooling operations 876, 878, 880 to generate an output 886 (e.g., the input to encoder 578 in FIG. 7). In some examples, the output 886 can include one or more feature maps generated from the input features 822 and the sets of pooled features from the pooling operations 876, 878, 880.

Moreover, the fusion block 730 can perform convolution-based fusion operations 888, 890, 892 on the input features 882 and the sets of pooled features from the pooling operations 876, 878, 880. For example, the fusion block 730 can perform a convolution-based fusion operation 888 on the input features 882 and a set of pooled features from the pooling operation 876, and generate output features 894. Similarly, the fusion block 730 can perform a convolution-based fusion operation 890 on the input features 882 and a set of pooled features from the pooling operation 878, and generate output features 896. The fusion block 730 can also perform a convolution-based fusion operation 892 on the input features 882 and a set of pooled features from the pooling operation 880, and generate output features 898. The fusion block 730 can then store the output features 894, 896, 898 on the deeper feature recycle bin 736 for future use.

In some examples, the output features 895 can include one or more feature maps generated by fusing the input features 882 with the set of pooled features from the pooling operation 876. Similarly, the output features 896 can include one or more feature maps generated by fusing the input features 882 with the set of pooled features from the pooling operation 878, and the output features 898 can include one or more feature maps generated by fusing the input features 882 with the set of pooled features from the pooling operation 880.

Using the systems and techniques described herein, a recycle network can be used to leverage redundancies between frames, increase efficiency, reduce power and processing costs, among other benefits. For instance, as described herein, the systems and techniques can leverage redundancy and/or similarities between frames to increase processing efficiency and reduce computational costs by recycling (e.g., reusing) features from previous frames when performing segmentation of later frames.

Figure 9:
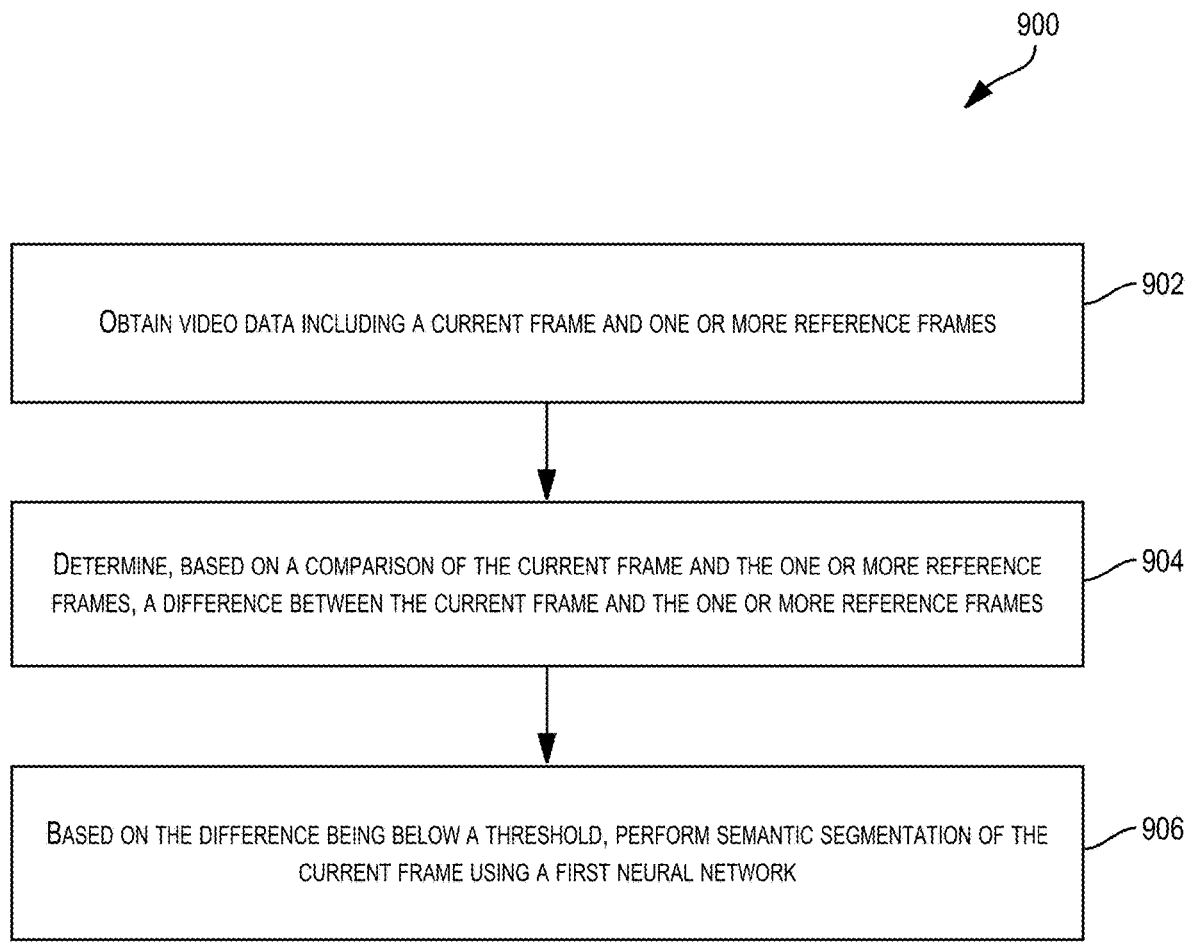
FIG. 9 is a flowchart illustrating an example process for semantic video segmentation using a segmentation network and a recycle network, in accordance with some examples of the present disclosure.

FIG. 9 is a flow diagram illustrating an example of a process 900 for performing segmentation (e.g., semantic video segmentation) using the techniques described herein. In some examples, the process 900 can include performing semantic video segmentation using a segmentation network (e.g., segmentation network 122) and a recycle network (e.g., recycle network 124), as shown in FIG. 9. The steps outlined herein are non-limiting examples provided for illustration purposes, and can be implemented in any combination thereof, including combinations that exclude, add, or modify certain steps.

At block 902, the process 900 can include obtaining video data including a current frame (e.g., current frame 202) and one or more reference frames (e.g., reference frame 204). In some examples, the one or more reference frames can be one or more previous frames (e.g., previous to the current frame). In some cases, the one or more reference frames can include a single reference frame. In other cases, the one or more reference frames can include multiple reference frames.

At block 904, the process 900 can include determining, based on a comparison of the current frame (e.g., image data of the current frame) with the one or more reference frames (e.g., image data of the one or more reference frames), a difference between the current frame and the one or more reference frames. In some examples, the comparison and/or the difference can be performed/determined by a decision component, such as the recycle decision component 210, as previously described with respect to FIGS. 2 and 3. In some examples, the comparison and/or the difference can alternatively (or additionally) be performed and/or determined by a separate and/or different neural network (e.g., separate and/or different from the first neural network, the second neural network, and/or a recycle decision component), such as a classification network or a classification and regression network for example.

The comparison and/or difference can be based on image data associated with the current frame and the one or more reference frames. For example, the comparison and/or difference can be based on a comparison and difference of image data of the current frame and the one or more reference frames (e.g., at frame level, pixel level, region level, and/or any other level). In some cases, the comparison and/or difference can be (alternatively or additionally) based on data from one or more sensors such as, for example, one or more IMUs, one or more optical flow sensors, one or more accelerometers, one or more gyroscopes, one or more radars, one or more LIDARs, etc. In some examples, the comparison and/or difference can be based on motion data, pose information, image data, etc.

In some cases, the comparison can include an image-level comparison and/or a region-level comparison, and the difference can be based on the image-level comparison and/or the region-level comparison. In some examples, the image-level comparison can include a comparison of pixels in the current frame and the one or more reference frames (and/or the entire current frame and the entire one or more reference frames), and the difference can be based on the comparison of pixels (and/or the entire frames). Moreover, in some examples, the region-level comparison can include a comparison of regions in the current frame and the one or more reference frames, and the difference can be based on the comparison of regions. The regions can include, for example and without limitation, borders in the frames, blocks of image data, groups of pixels, and/or any portions of the current frame and the one or more reference frames.

In some examples, as previously described with respect to FIG. 3, a region-level comparison can include an iterative comparison of increasingly smaller regions of the current frame and the one or more reference frames where an additional comparison is performed for a smaller frame region each time a comparison for a larger frame region does not yield a difference above a threshold (e.g., above an upper threshold) or below a threshold (e.g., below a lower threshold). In some cases, the iterative comparison can be performed until a difference below or above a certain threshold is determined.

In some cases, difference can include a difference between pixel values associated with the current frame and pixel values associated with the one or more reference frames. Moreover, in some cases, the difference can include an amount of change in motion between the current frame and the one or more reference frames. For example, the difference can include a difference in motion between the current frame and the one or more reference frames. In some cases, the motion can be determined based on image data of the current frame and the one or more reference frames, optical flow data associated with the current frame and the one or more reference frames, pose information associated with the current frame and the one or more reference frames, motion sensor data (e.g., IMU data, etc.), and/or any other motion and/or sensor data.

In some cases, the difference can include a score indicating changes/differences between the current frame and the one or more reference frames (e.g., features changes/differences, motion changes/differences, image data changes/differences, etc.). In some examples, the score can be generated by a classification network based on the comparison. In some examples, the score can be generated by a decision component, such as recycle decision component 210.

In some cases, the difference (and/or an associated score) can be based on a distance between one or more boundaries in a first boundary map associated with the current frame and one or more boundaries in a second boundary map associated with the one or more reference frames. In some examples, the difference can be based on any differences between feature boundaries associated with the current frame and the one or more reference frames.

In some cases, the second neural network can be a segmentation network and the first neural network can be a subnetwork structure of the segmentation network. Moreover, in some cases, the second neural network can be a full and/or deeper segmentation network and the first neural network can be a subnetwork of the second neural network or a separate, smaller (and/or shallower) spatiotemporal network.

In some cases, the second neural network includes a multi-level network structure, and the multi-level network structure includes one or more deeper levels than a network structure associated with the first neural network. Moreover, in some cases, the lower-spatial resolution features are extracted at the one or more deeper levels of the multi-level network structure.

In some examples, the second neural network can be associated with one or more deeper levels of processing than the first neural network (e.g., the lower levels of the segmentation network 122 associated with deeper features 530, 540, 550, or deeper features 706, 708, 710). The lower-spatial resolution features (e.g., deeper features) can be features extracted at the one or more deeper levels of the segmentation network 122, and the one or more deeper levels of the segmentation network 122 can be deeper than a deepest/lowest level of the first neural network and associated with the higher-spatial resolution features.

In some cases, a structure of the first neural network can be based on a top level of the second neural network (e.g., encoders 504, 510, 514, 518, 522) and can implement some or all of the parameters/coefficients implemented at the top level of the second neural network and/or one or more different parameters/coefficients. In some examples, the first neural network can include the top level of the second neural network without additional, deeper levels. In other examples, the first neural network can include the top level of the second neural network and a subset of the lower levels of the second neural network.

Based on the difference being below a threshold, the process 900 can include, at block 906, performing semantic segmentation of the current frame using a first neural network (e.g., recycle network 124). The first neural network can perform the semantic segmentation based on higher-spatial resolution features (e.g., features 560 or 722) extracted from the current frame by the first neural network and lower-resolution features (e.g., deeper features 530, 540, 550, or deeper features 706, 708, 710) previously extracted from one or more reference frames by a second neural network (e.g., segmentation network 122). In some examples, the first neural network can have a smaller structure than the second neural network and/or a lower processing cost than the second neural network, as described above. For example, the first neural network may be smaller (or lighter) than the second neural network (e.g., may have fewer layers and/or hierarchical levels of layers or nodes), and thus may have lower compute resource utilization or requirements, may be more efficient, may have a smaller power/processing footprint, etc.

In some aspects, the semantic segmentation can be further based on one or more segmentation maps (e.g., one or more of the segmentation outputs or segmentation data 222, 402, 558, 602, 714, 802 described above) generated based on one or more previous frames. In some aspects, the process 900 can include generating, based on the semantic segmentation, a segmentation output (e.g., segmentation output or data 224, 412, 582, 610, 740 described above) including one or more segmentation maps associated with the current frame.

In some examples, performing the semantic segmentation can include obtaining the lower-spatial resolution features from storage (e.g., deeper features store 212, deeper feature recycle bins 732, 734, and/or 736), pooling the lower-spatial resolution features, and determining a set of features associated with the current frame. The set of features can be determined by combining the pooled lower-spatial resolution features with the higher-spatial resolution features. Performing the semantic segmentation can further include generating a segmentation output based on the set of features associated with the current frame. In some aspects, the process 900 can include generating a feature update based on a convolution-based fusion of the pooled lower-spatial resolution features and the higher-spatial resolution features. The process 900 can include storing the feature update in a feature store (e.g., deeper features store 212, deeper feature recycle bins 732, 734, and/or 736) associated with the video data.

In some aspects, the process 900 can include determining, based on a second comparison of an additional frame (e.g., image data associated with the additional frame) and one or more additional reference frames (e.g., image data associated with the one or more additional reference frames), an additional difference between the additional frame and the one or more additional reference frames. Based on the additional difference being above the threshold, the process 900 can include performing semantic segmentation of the additional frame using the second neural network. In some examples, the one or more additional reference frames can include the current frame and/or a reference frame(s) from the one or more reference frames. In some cases, the additional frame can be a previous current frame (e.g., previous to the current frame 202) or a future current frame (e.g., after the current frame 202).

In some examples, the process 900 may be performed by one or more computing devices or apparatuses. In one illustrative example, the process 900 can be performed by the image processing system 100 shown in FIG. 1 and/or one or more computing devices with the computing device architecture 1000 shown in FIG. 10. In some cases, such a computing device or apparatus may include a processor, microprocessor, microcomputer, or other component of a device that is configured to carry out the steps of the process 900. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
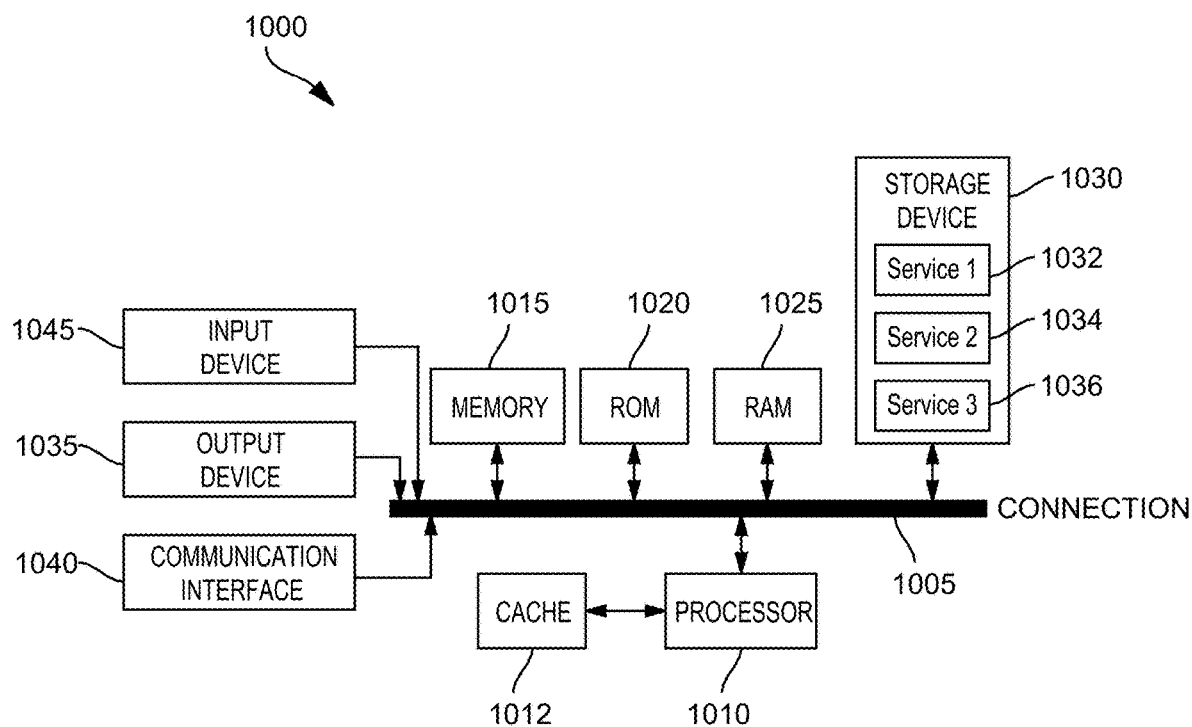
FIG. 10 illustrates an example computing device architecture, in accordance with some examples of the present disclosure.

FIG. 10 illustrates an example computing device architecture 1000 of an example computing device which can implement various techniques described herein. For example, the computing device architecture 1000 can implement at least some portions of the image processing system 100 shown in FIG. 1. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache 1012 of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. In some cases, the processor 1010 can include any general purpose processor and a hardware or software service (e.g., services 1032, 1034, and 1036) stored in storage device 1030 and configured to control the processor 1010. In some cases, the processor 1010 can include a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device. In some instances, multimodal computing devices can enable a user to provide multiple types of input to communicate with the computing device architecture 1000. The communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1105, read only memory (ROM) 1020, and hybrids thereof. The storage device 1030 can include software, code, firmware, etc., for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of processing one or more frames, comprising: obtaining video data including a current frame and one or more reference frames; determining, based on a comparison of the current frame and the one or more reference frames, a difference between the current frame and the one or more reference frames; and based on the difference being below a threshold, performing semantic segmentation of the current frame using a first neural network based on higher-spatial resolution features extracted from the current frame and lower-spatial resolution features extracted from the one or more reference frames by a second neural network, the first neural network having at least one of a smaller structure and a lower processing cost than the second neural network.

Aspect 2. The method of Aspect 1, wherein the second neural network comprises a segmentation network and the first neural network comprises a subnetwork structure of the segmentation network.

Aspect 3: The method of any of Aspects 1 to 2, wherein the difference comprises a difference between pixel values associated with the current frame and pixel values associated with the one or more reference frames.

Aspect 4: The method of any of Aspects 1 to 3, wherein the difference comprises an amount of change in motion between the current frame and the one or more reference frames.

Aspect 5: The method of any of Aspects 1 to 4, wherein the comparison comprises generating a score using classification network, the score indicating a magnitude of the difference between the current frame and the one or more reference frames.

Aspect 6: The method of any of Aspects 1 to 5, wherein the difference is based on a distance between one or more boundaries in a first boundary map associated with the current frame and one or more boundaries in a second boundary map associated with the one or more reference frames.

Aspect 7: The method of any of Aspects 1 to 6, wherein the comparison comprises at least one of an image-level comparison and a region-level comparison, and wherein the difference is based on at least one of the image-level comparison and the region-level comparison.

Aspect 8: The method of any of Aspects 1 to 7, wherein the second neural network comprises a multi-level network structure, wherein the multi-level network structure includes one or more deeper levels than a network structure associated with the first neural network, and wherein the lower-spatial resolution features are extracted at the one or more deeper levels of the multi-level network structure.

Aspect 9: The method of any of Aspects 1 to 8, wherein the semantic segmentation is further based on one or more segmentation maps generated based on one or more previous frames.

Aspect 10: The method of any of Aspects 1 to 9, further comprising: generating, based on the semantic segmentation, a segmentation output comprising one or more segmentation maps associated with the current frame.

Aspect 11: The method of any of Aspects 1 to 10, wherein performing the semantic segmentation comprises: obtaining the lower-spatial resolution features from storage; pooling the lower-spatial resolution features; determining a set of features associated with the current frame, the set of features being determined by combining the pooled lower-spatial resolution features with the higher-spatial resolution features; and generating a segmentation output based on the set of features associated with the current frame.

Aspect 12: The method of Aspect 11, further comprising: generating a feature update based an a convolution-based fusion of the pooled lower-spatial resolution features and the higher-spatial resolution features; and storing the feature update in the storage.

Aspect 13: The method of any of Aspects 1 to 12, further comprising: determining, based on a second comparison an additional frame and one or more additional reference frames, an additional difference between the additional frame and the one or more additional reference frames; and based on the additional difference being above the threshold, performing, using the second neural network, semantic segmentation of the additional frame.

Aspect 14: An apparatus for processing one or more frames, comprising: at least one memory; and one or more processors communicatively coupled to the at least one memory, the one or more processors being configured to: obtain video data comprising a current frame and one or more reference frames; determine, based on a comparison of the current frame and the one or more reference frames, a difference between the current frame and the one or more reference frames; and based on the difference being below a threshold, perform semantic segmentation of the current frame using a first neural network based on higher-spatial resolution features extracted from the current frame and lower-spatial resolution features extracted from the one or more reference frames by a second neural network, the first neural network having at least me of a smaller structure and a lower processing cost than the second neural network.

Aspect 15: The apparatus of Aspect 14, wherein the second neural network comprises a segmentation network and the first neural network comprises a subnetwork structure of the segmentation network.

Aspect 16: The apparatus of any of Aspects 14 to 15, wherein the difference comprises a difference between pixel values associated with the current frame and pixel values associated with the one or more reference frames.

Aspect 17: The apparatus of any of Aspects 14 to 16, wherein the difference comprises an amount of change in motion between the current frame and the one or more reference frames.

Aspect 18: The apparatus of an of Aspects 14 to 17, wherein the comparison comprises generating a score using classification network, the score indicating a magnitude of the difference between the current frame and the one or more reference frames.

Aspect 19: The apparatus of any of Aspects 14 to 18, wherein the difference is based on a distance between one or more boundaries in a first boundary map associated with the current frame and one or more boundaries in a second boundary map associated with the one or more reference frames.

Aspect 20: The apparatus of any of Aspects 14 to 19, wherein the comparison comprises at least one of an image-level comparison and a region-level comparison, and wherein the difference is based on at least one of the image-level comparison and the region-level comparison.

Aspect 21: The apparatus of any of Aspects 14 to 20, wherein the second neural network comprises a multi-level network structure, wherein the multi-level network structure includes one or more deeper levels than a network structure associated with the first neural network, and wherein the lower-spatial resolution features are extracted at the one or more deeper levels of the multi-level network structure.

Aspect 22: The apparatus of any of Aspects 14 to 21, wherein the semantic segmentation is further based on one or more segmentation maps generated based on one or more previous frames.

Aspect 23: The apparatus of any of Aspects 14 to 22, the one or more processors being configured to: generate, based on the semantic segmentation, a segmentation output comprising one or more segmentation maps associated with the current frame.

Aspect 24: The apparatus of any of Aspects 14 to 23, wherein performing the semantic segmentation comprises: obtaining the lower-spatial resolution features from storage; pooling the lower-spatial resolution features; determining a set of features associated with the current frame, the set of features being determined by combining the pooled lower-spatial resolution features with the higher-spatial resolution features; and generating a segmentation output based on the set of features associated with the current frame.

Aspect 25: The apparatus of Aspect 24, the one or more processors being configured to: generate a feature update based on a convolution-based fusion of the pooled lower-spatial resolution features and the higher-spatial resolution features, and store the feature update in the storage.

Aspect 26: The apparatus of any of Aspects 14 to 25, the one or more processors being configured to determine, based on a second comparison an additional frame and one or more additional reference frames, an additional difference between the additional frame and the one or more additional reference frames; and based on the additional difference being above the threshold, perform, using the second neural network, semantic segmentation of the additional frame.

Aspect 27: The apparatus of any of Aspects 14 to 26, wherein the apparatus is a mobile device.

Aspect 28: The apparatus of any of Aspects 14 to 27, further comprising at least one of a camera and a display device.

Aspect 29: At least one non-transitory computer-readable storage medium having stored thereon instructions which, when executed by one or more pressors, cause the one or more processors to perform operations according to any of Aspects 1 to 28.

Aspect 30: An apparatus comprising one or more means for performing operations according to any of Aspects 1 to 28.

What is claimed is:

1. A method of processing one or more frames, comprising:
    obtaining video data including a current frame and one or more reference frames;
    determining, based on a comparison of the current frame and the one or more reference frames, a difference between the current frame and the one or more reference frames;
    based on the difference being below a threshold, determining to perform semantic segmentation of the current frame using a first neural network;
    based on determining to perform the semantic segmentation of the current frame using the first neural network, obtaining lower-spatial resolution features from storage, wherein the lower-spatial resolution features are extracted from multiple reference frames by a second neural network, the first neural network having at least one of a smaller structure and a lower processing cost than the second neural network;
    pooling the lower-spatial resolution features to generate pooled lower-spatial resolution features, the pooled lower-spatial resolution features representing the lower-spatial resolution features extracted from the multiple reference frames;
    determining a set of features associated with the current frame by combining the pooled lower-spatial resolution features with higher-spatial resolution features extracted from the current frame by the first neural network;
    generating a segmentation output using the first neural network based on the set of features associated with the current frame; and
    updating the one or more reference frames with the current frame and performing semantic segmentation determination of future frames using the first neural network or the second neural network based on the updated one or more reference frames.

2. The method of claim 1, wherein the second neural network comprises a segmentation network and the first neural network comprises a subnetwork structure of the segmentation network.

3. The method of claim 1, wherein the difference comprises a difference between pixel values associated with the current frame and pixel values associated with the one or more reference frames.

4. The method of claim 1, wherein the difference comprises an amount of change in motion between the current frame and the one or more reference frames.

5. The method of claim 1, wherein the comparison comprises generating a score using classification network, the score indicating a magnitude of the difference between the current frame and the one or more reference frames.

6. The method of claim 1, wherein the difference is based on a distance between one or more boundaries in a first boundary map associated with the current frame and one or more boundaries in a second boundary map associated with the one or more reference frames.

7. The method of claim 1, wherein the comparison comprises at least one of an image-level comparison and a region-level comparison, and wherein the difference is based on at least one of the image-level comparison and the region-level comparison.

8. The method of claim 1, wherein the second neural network comprises a multi-level network structure, wherein the multi-level network structure includes one or more deeper levels than a network structure associated with the first neural network, and wherein the lower-spatial resolution features are extracted at the one or more deeper levels of the multi-level network structure.

9. The method of claim 1, wherein the semantic segmentation is further based on one or more segmentation maps generated based on one or more previous frames.

10. The method of claim 1, further comprising:
generating, based on the semantic segmentation, a segmentation output comprising one or more segmentation maps associated with the current frame.

11. The method of claim 1, wherein the higher-spatial resolution features are temporally variant relative to the lower-spatial resolution features.

12. The method of claim 1, further comprising:
generating a feature update based on a convolution-based fusion of the pooled lower-spatial resolution features and the higher-spatial resolution features; and
storing the feature update in the storage.

13. The method of claim 1, further comprising:
determining, based on a second comparison of an additional frame and one or more additional reference frames, an additional difference between the additional frame and the one or more additional reference frames; and
based on the additional difference being above the threshold, performing, using the second neural network, semantic segmentation of the additional frame.

14. An apparatus for processing one or more frames, comprising:
at least one memory; and
one or more processors communicatively coupled to the at least one memory, the one or more processors being configured to:
obtain video data comprising a current frame and one or more reference frames;
determine, based on a comparison of the current frame and the one or more reference frames, a difference between the current frame and the one or more reference frames;
based on the difference being below a threshold, determine to perform semantic segmentation of the current frame using a first neural network;
based on determining to perform the semantic segmentation of the current frame using the first neural network, obtain lower-spatial resolution features from storage, wherein the lower-spatial resolution features are extracted from multiple reference frames by a second neural network, the first neural network having at least one of a smaller structure and a lower processing cost than the second neural network;
pool the lower-spatial resolution features to generate pooled lower-spatial resolution features, the pooled lower-spatial resolution features representing the lower-spatial resolution features extracted from the multiple reference frames;
determine a set of features associated with the current frame by combining the pooled lower-spatial resolution features with higher-spatial resolution features extracted from the current frame by the first neural network;
generate a segmentation output using the first neural network based on the set of features associated with the current frame; and
update the one or more reference frames with the current frame and perform semantic segmentation determination of future frames using the first neural network or the second neural network based on the updated one or more reference frames.

15. The apparatus of claim 14, wherein the second neural network comprises a segmentation network and the first neural network comprises a subnetwork structure of the segmentation network.

16. The apparatus of claim 14, wherein the difference comprises a difference between pixel values associated with the current frame and pixel values associated with the one or more reference frames.

17. The apparatus of claim 14, wherein the difference comprises an amount of change in motion between the current frame and the one or more reference frames.

18. The apparatus of claim 14, wherein the comparison comprises generating a score using classification network, the score indicating a magnitude of the difference between the current frame and the one or more reference frames.

19. The apparatus of claim 14, wherein the difference is based on a distance between one or more boundaries in a first boundary map associated with the current frame and one or more boundaries in a second boundary map associated with the one or more reference frames.

20. The apparatus of claim 14, wherein the comparison comprises at least one of an image-level comparison and a region-level comparison, and wherein the difference is based on at least one of the image-level comparison and the region-level comparison.

21. The apparatus of claim 14, wherein the second neural network comprises a multi-level network structure, wherein the multi-level network structure includes one or more deeper levels than a network structure associated with the first neural network, and wherein the lower-spatial resolution features are extracted at the one or more deeper levels of the multi-level network structure.

22. The apparatus of claim 14, wherein the semantic segmentation is further based on one or more segmentation maps generated based on one or more previous frames.

23. The apparatus of claim 14, the one or more processors being configured to:
generate, based on the semantic segmentation, a segmentation output comprising one or more segmentation maps associated with the current frame.

24. The apparatus of claim 14, the one or more processors being configured to:
generate a feature update based on a convolution-based fusion of the pooled lower-spatial resolution features and the higher-spatial resolution features; and
store the feature update in the storage.

25. The apparatus of claim 14, the one or more processors being configured to:

determine, based on a second comparison of an additional frame and one or more additional reference frames, an additional difference between the additional frame and the one or more additional reference frames; and based on the additional difference being above the threshold, perform, using the second neural network, semantic segmentation of the additional frame.

26. The apparatus of claim 14, wherein the apparatus is a mobile device.

27. The apparatus of claim 14, further comprising at least one of a camera and a display device.

28. At least one non-transitory computer-readable storage medium having stored thereon instructions which, when executed by one or more processors, cause the one or more processors to:
obtain video data comprising a current frame and one or more reference frames;
determine, based on a comparison of the current frame and the one or more reference frames, a difference between the current frame and the one or more reference frames;
based on the difference being below a threshold, determine to perform, using a first neural network, semantic segmentation of the current frame;
based on determining to perform the semantic segmentation of the current frame using the first neural network, obtain lower-spatial resolution features from storage, wherein the lower-spatial resolution features are extracted from multiple reference frames by a second neural network, the first neural network having at least one of a smaller structure and a lower processing cost than the second neural network;
pool the lower-spatial resolution features to generate pooled lower-spatial resolution features, the pooled lower-spatial resolution features representing the lower-spatial resolution features extracted from the multiple reference frames;
determine a set of features associated with the current frame by combining the pooled lower-spatial resolution features with higher-spatial resolution features extracted from the current frame by the first neural network;
generate a segmentation output using the first neural network based on the set of features associated with the current frame; and
update the one or more reference frames with the current frame and perform semantic segmentation determination of future frames using the first neural network or the second neural network based on the updated one or more reference frames.

29. The at least one non-transitory computer-readable storage medium of claim 28, wherein the second neural network comprises a segmentation network and the first neural network comprises a subnetwork structure of the segmentation network.

30. A method of processing one or more frames, comprising:
obtaining video data including a current frame and one or more reference frames;
obtaining sensor data from one or more sensors;
determining, based on a comparison of the current frame, the one or more reference frames, and the sensor data, a difference between the current frame and the one or more reference frames
based on the difference being below a threshold, determining to perform semantic segmentation of the current frame using a first neural network;
based on determining to perform the semantic segmentation of the current frame using the first neural network, obtaining lower-spatial resolution features from storage, wherein the lower-spatial resolution features are extracted from multiple reference frames by a second neural network, the first neural network having at least one of a smaller structure and a lower processing cost than the second neural network;
pooling the lower-spatial resolution features to generate pooled lower-spatial resolution features, the pooled lower-spatial resolution features representing the lower-spatial resolution features extracted from the multiple reference frames;
determining a set of features associated with the current frame by combining the pooled lower-spatial resolution features with higher-spatial resolution features extracted from the current frame by the first neural network; and
generating a segmentation output using the first neural network based on the set of features associated with the current frame.

31. The method of claim 30, further comprising:
updating features of the one or more reference frames with features of the current frame and performing semantic segmentation determination of future frames based on the updated features of the one or more reference frames.

* * * * *